US009959712B2

(12) United States Patent
Karra et al.

(10) Patent No.: US 9,959,712 B2
(45) Date of Patent: May 1, 2018

(54) TYPES OF GAMES HAVING MULTIPLE STAGES AND THEIR APPLICATIONS UTILIZING GAME-OPERATING COMPUTER SYSTEMS AND COMPUTER-IMPLEMENTED METHODS

(71) Applicant: Intralot S.A.—Integrated Lottery Systems and Services, Athens (GR)

(72) Inventors: Ermioni Karra, Athens (GR); Panagiotis Kousteins, Athens (GR); Gianna Karra, Athens (GR)

(73) Assignee: Intralot S.A.—Integrated Lottery Systems and Services, Athens (GR)

( * ) Notice: Subject to any disclaimer, the term of this patent is extended or adjusted under 35 U.S.C. 154(b) by 0 days. days.

(21) Appl. No.: 15/157,973

(22) Filed: May 18, 2016

(65) Prior Publication Data

US 2016/0343198 A1 Nov. 24, 2016

Related U.S. Application Data

(60) Provisional application No. 62/163,112, filed on May 18, 2015.

(51) Int. Cl.

*G06F 17/00* (2006.01)
*G07F 17/32* (2006.01)

(52) U.S. Cl.

CPC ............ *G07F 17/329* (2013.01); *G07F 17/32* (2013.01); *G07F 17/3225* (2013.01); *G07F 17/3258* (2013.01); *G07F 17/3272* (2013.01)

(58) Field of Classification Search

None

See application file for complete search history.

(56) References Cited

U.S. PATENT DOCUMENTS 7,155,014 B1 * 12/2006 Hamman ................ G07F 17/32 380/251
8,864,578 B2 * 10/2014 Bennett, III ........ G07F 17/3241 463/17

(Continued)

OTHER PUBLICATIONS

International Search Report and Written Opinion from International Application No. PCT/IB2016/000758 dated Aug. 2, 2016.

*Primary Examiner* — Ronald Laneau
(74) *Attorney, Agent, or Firm* — Greenberg Traurig, LLP

(57) ABSTRACT

In some embodiments, the present invention provides for a computer-implemented method for conducting a game, having at least steps of: electronically receiving, by at least one specifically programmed computer processor, in real-time, game entries data representing game entries of players to participate in the game; where each game entry identifies a single playing instance of the game, having a plurality of drawing events; electronically determining, by the processor, in real-time, based on a game mode, a plurality of winning results for the plurality of drawing events respectively; electronically determining, by the processor, in real-time, a winning game entry, having selections which win each drawing event of the plurality of drawing events; and electronically recording, by the processor, in real-time, a portion of a jackpot to be distributed to a particular player associated with the winning game entry.

22 Claims, 13 Drawing Sheets

(56) References Cited

U.S. PATENT DOCUMENTS

| | | | | |
|---|---|---|---|---|
| 2002/0006821 | A1 * | 1/2002 | Park | G07C 15/006<br>463/17 |
| 2004/0056416 | A1 * | 3/2004 | Bennett, III | G07C 15/00<br>273/269 |
| 2015/0126262 | A1 | 5/2015 | Litos et al. | |

* cited by examiner

| Price per game/draw | 1.00 € | JACKPOT DRIVEN MATRIX | | | | | | | | | |
|---|---|---|---|---|---|---|---|---|---|---|---|
| Total Numbers available | | 100 | | 80 | | 60 | | 40 | | 20 | |
| Drawn Numbers | | 26 | | 18 | | 10 | | 3 | | 1 | |
| Selections | | 10 | | 8 | | 6 | | 3 | | 1 | |
| Payout | | 52.6% | | 49.1% | | 49.6% | | 49.7% | | 50.0% | |
| Odds 1st Category | | 3,258,880 | | 662,451 | | 238,399 | | 9,880 | | 20 | |
| Categories | | Prize | Odds | Prize | Odds | Prize | Odds | Prize | Odds | Prize | Odds |
| 1 | match 10 numbers | 100,000.0 | 3,258,880.5 | | | | | | | | |
| 2 | match 9 numbers | 2,000.0 | 74,866.2 | | | | | | | | |
| 3 | match 8 numbers | 200.0 | 4,102.3 | 10,000.0 | 662,451.1 | | | | | | |
| 4 | match 7 numbers | 15.0 | 406.0 | 500.0 | 14,691.5 | | | | | | |
| 5 | match 6 numbers | 5.0 | 65.3 | 80.0 | 825.7 | 9,800.0 | 238,399.3 | | | | |
| 6 | match 5 numbers | 5.0 | 16.3 | 4.0 | 89.5 | 300.0 | 3,973.3 | | | | |
| 7 | match 4 numbers | 0.0 | 6.3 | 2.0 | 17.0 | 10.0 | 194.6 | | | | |
| 8 | match 3 numbers | 0.0 | 3.7 | 1.0 | 5.5 | 3.0 | 21.3 | 1,800.0 | 9,880.0 | | |
| 9 | match 2 numbers | 0.0 | 3.5 | 0.0 | 3.1 | 1.0 | 4.8 | 10.0 | 89.0 | | |
| 10 | match 1 numbers | 0.0 | 6.0 | 0.0 | 3.3 | 0.0 | 2.4 | 1.0 | 4.9 | 10.0 | 20.0 |
| 11 | no match | 0.0 | 24.1 | 0.0 | 8.6 | 0.0 | 3.2 | 0.0 | 1.3 | 0.0 | 1.1 |
| overall odds | 12.6 | 7.82% | 3.9 | 25.35% | 3.9 | 25.94% | 4.7 | 21.36% | 20.0 | 5.00% | |

*FIG. 6A*

| Price per game/draw | 1.00 € | MID-TIER WINNINGS EMPHASIS | | | | | | | | | |
|---|---|---|---|---|---|---|---|---|---|---|---|
| Total Numbers available | | 100 | | 80 | | 60 | | 40 | | 20 | |
| Drawn Numbers | | 24 | | 16 | | 10 | | 5 | | 1 | |
| Selections | | 10 | | 8 | | 6 | | 3 | | 1 | |
| Payout | | 70.4% | | 60.4% | | 61.2% | | 58.2% | | 50.0% | |
| Odds 1st Category | | 8,826,135 | | 2,252,334 | | 238,399 | | 988 | | 20 | |
| Categories | | Prize | Odds | Prize | Odds | Prize | Odds | Prize | Odds | Prize | Odds |
| 1 | match 10 numbers | 250,000.0 | 8,826,134.6 | | | | | | | | |
| 2 | match 9 numbers | 20,000.0 | 174,200.0 | | | | | | | | |
| 3 | match 8 numbers | 2,000.0 | 8,258.4 | 100,000.0 | 2,252,333.9 | | | | | | |
| 4 | match 7 numbers | 30.0 | 711.4 | 5,000.0 | 39,591.8 | | | | | | |
| 5 | match 6 numbers | 5.0 | 100.2 | 250.0 | 1,795.5 | 50,000.0 | 238,399.3 | | | | |
| 6 | match 5 numbers | 5.0 | 27.0 | 15.0 | 159.3 | 500.0 | 3,973.3 | | | | |
| 7 | match 4 numbers | 0.0 | 7.5 | 5.0 | 25.1 | 8.0 | 194.6 | | | | |
| 8 | match 3 numbers | 0.0 | 3.9 | 0.0 | 6.8 | 5.0 | 21.3 | 400.0 | 988.0 | | |
| 9 | match 2 numbers | 0.0 | 3.3 | 0.0 | 3.2 | 0.0 | 4.8 | 5.0 | 28.2 | | |
| 10 | match 1 numbers | 0.0 | 5.1 | 0.0 | 2.9 | 0.0 | 2.4 | 0.0 | 3.3 | 10.0 | 20.0 |
| 11 | no match | 0.0 | 18.1 | 0.0 | 6.5 | 0.0 | 3.2 | 0.0 | 1.5 | 0.0 | 1.1 |
| overall odds | 17.6 | 5.69% | 21.4 | 4.68% | 19.1 | 5.24% | 27.4 | 3.64% | 28.0 | 5.00% | |

*FIG. 6B*

| Price per game/draw | | 1.00 € | SIMPLE PARTICIPATION | | | | | | | | |
|---|---|---|---|---|---|---|---|---|---|---|---|
| Total Numbers available | | 50 | | 50 | | 50 | | 50 | | 50 | |
| Drawn Numbers | | 1 | | 2 | | 3 | | 4 | | 5 | |
| Selections | | 5 | | 5 | | 5 | | 5 | | 5 | |
| Payout | | 50.0% | | 49.0% | | 57.4% | | 55.0% | | 54.8% | |
| Odds 1st Category | | 10 | | 123 | | 1,960 | | 46,060 | | 2,118,760 | |
| Categories | | Prize | Odds | Prize | Odds | Prize | Odds | Prize | Odds | Prize | Odds |
| 1 | match 5 numbers | | | | | | | | | 400,000.0 | 2,118,760.0 |
| 2 | match 4 numbers | | | | | | | 15,000.0 | 46,060.0 | 5.0 | 9,416.7 |
| 3 | match 3 numbers | | | | | 900.0 | 1,960.0 | 5.0 | 511.8 | 5.0 | 214.0 |
| 4 | match 2 numbers | | | 60.0 | 122.5 | 5.0 | 43.6 | 5.0 | 23.3 | 5.0 | 14.9 |
| 5 | match 1 numbers | 5.0 | 10.0 | 0.0 | 5.4 | 0.0 | 4.0 | 0.0 | 3.2 | 0.0 | 2.8 |
| 6 | no match | 0.0 | 1.1 | 0.0 | 1.2 | 0.0 | 1.4 | 0.0 | 1.5 | 0.0 | 1.7 |

*FIG. 7*

*FIG. 8B*
intralot
3
CALL NUMBERS
DAILY PARTICIPATION
HOW TO WIN
Wait for the daily draws.
Match the drawn numbers
to your numbers
SEE PAY TABLE ON
THE BACK SIDE OF
THE TICKET
WEEKLY TICKET PRICE: 12$
DAILY TICKET PRICE: 3$
< FOR DISPLAY PURPOSES ONLY >

TYPES OF GAMES HAVING MULTIPLE STAGES AND THEIR APPLICATIONS UTILIZING GAME-OPERATING COMPUTER SYSTEMS AND COMPUTER-IMPLEMENTED METHODS

RELATED APPLICATIONS

This application claims the priority of U.S. provisional patent application No. 62/163,112; filed May 18, 2015; entitled "GAME-OPERATING COMPUTER SYSTEMS FOR GAMES HAVING MULTIPLE STAGES AND COMPUTER-IMPLEMENTED METHODS OF USE THEREOF," which is incorporated herein by reference in its entirety for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright, Intralot SA., All Rights Reserved.

FIELD OF INVENTION

In some embodiments, the present invention is related to new types of games having multiple stages and their applications utilizing game-operating computer systems and computer-implemented methods.

BACKGROUND OF THE INVENTION

In a typical game, such as a lottery type game, players purchase a participation in a single drawing. Player(s) who has/have ticket(s) with all winning numbers would share a common jackpot.

SUMMARY OF THE INVENTION

In some embodiments, the present invention provides for a computer-implemented method for conducting a game, where the method includes at least the following steps of: electronically receiving, by at least one specifically programmed computer processor, via a computer network, in real-time, game entries data representing game entries from at least a thousand (1,000) players to participate in the game; where at least one game entry identifies a single playing instance of the game, where the single playing instance of the game includes: i) a first selection to participate in a first drawing event, where the first selection identifies R numbers from a first pool of P numbers; ii) a second selection to participate in a second drawing event, where the second selection identifies Q numbers from a second pool of S numbers; iii) a third selection to participate in a third drawing event, where the third selection identifies T numbers from a third pool of U numbers; iv) a fourth selection to participate in a fourth drawing event, where the fourth selection identifies W numbers from a fourth pool of X numbers; and v) a fifth selection to participate in a fifth drawing event, where the fifth selection identifies Y numbers from a fifth pool of Z numbers; electronically determining, by the at least one specifically programmed computer processor, in real-time, based on at least one game mode, a plurality of winning results includes: i) at least one first winning result of the first drawing event, ii) at least one second winning result of the second drawing event, iii) at least one third winning result of the third drawing event, iv) at least one fourth winning result of the fourth drawing event, and v) at least one fifth winning result of the fifth drawing event; electronically determining, by the at least one specifically programmed computer processor, in real-time, at least one winning game entry from the game entries data, where the at least one winning game entry is a particular game entry in which: i) the first selection matches the at least one first winning result of the first drawing event, ii) the second selection matches the at least one second winning result of the second drawing event, iii) the third selection matches the at least one third winning result of the third drawing event, iv) the fourth selection matches the at least one fourth winning result of the fourth drawing event, and v) the fifth selection matches the at least one fifth winning result of the fifth drawing event; and electronically recording, by the at least one specifically programmed computer processor, in real-time, at least one portion of a jackpot to be distributed to a particular player associated with the at least one winning game entry.

In some embodiments, the first pool of P numbers equals to the second pool of S numbers; the second pool of S numbers equals to the third pool of U numbers; the third pool of U numbers equals to the fourth pool of X numbers; and the fourth pool of X numbers equals to the fifth pool of Z numbers.

In some embodiments, the at least one game entry includes: i) a first game entry identifying the first selection, ii) a second game entry identifying the second selection, iii) a third game entry identifying the third selection, iv) a fourth game entry identifying the fourth selection, and v) a fifth game entry identifying the fifth selection.

In some embodiments, the first game entry is separately received from the second game entry, the second game entry is separately received from the third game entry, the third game entry is separately received from the fourth game entry, and the fourth game entry is separately received from the fifth game entry.

In some embodiments, the first drawing event is conducted during a first time period, the second drawing event is conducted during a second time period, the third drawing event is conducted during a third time period, the fourth drawing event is conducted during a fourth time period, and the fifth drawing event is conducted during a fifth time period.

In some embodiments, the exemplary method may further include a step of electronically recording, by the at least one specifically programmed computer processor, in real-time, a plurality of drawing prizes associated with the one winning game entry, where the plurality of drawing prizes includes: i) at least one first drawing prize associated with the at least one first winning result of the first drawing event, ii) at least one second drawing prize associated with the at least one second winning result of the second drawing event, iii) at least one third drawing prize associated with the at least one third winning result of the third drawing event, iv) at least one fourth drawing prize associated with the at least one fourth winning result of the fourth drawing event, and v) at least one fifth drawing prize associated with the at least one fifth winning result of the fifth drawing event.

In some embodiments, the exemplary method may further include a step of electronically determining, by the at least one specifically programmed computer processor, in real-time, a single winning distribution amount based on: i) the at least one portion of the jackpot, and ii) the plurality of drawing prizes.

In some embodiments, the single winning distribution amount is the sum of: i) the at least one portion of the jackpot, and ii) the plurality of drawing prizes.

In some embodiments, the R number is larger than the Q number, the Q number is larger than the T number, the T number is larger than the W number, and the W number is larger than the Y number;

In some embodiments, the at least one first winning result of the first drawing event is determined based on at least one first game mode; the at least one second winning result of the second drawing event is determined based on at least one second game mode; the at least one third winning result of the third drawing event is determined based on at least one third game mode; the at least one fourth winning result of the fourth drawing event is determined based on at least one fourth game mode; and the at least one fifth winning result of the fifth drawing event is determined based on at least one fifth game mode.

In some embodiments, the at least one first game mode is different from the at least one second game mode; the at least one second game mode is different from the at least one third game mode; the at least one third game mode is different from the at least one fourth game mode; and the at least one fourth game mode is different from the at least one fifth game mode.

In some embodiments, the present invention provides for a specifically programmed game operating computer system for conducting a game which includes at least components of: at least one specialized computer machine, including: a non-transient memory, electronically storing particular computer executable program code; and at least one computer processor which, when executing the particular program code, becomes a specifically programmed computer processor of the specifically programmed game operating computer system that is configured to perform at least the following operations: electronically receiving, via a computer network, in real-time, game entries data representing game entries from at least a thousand (1,000) players to participate in the game; where at least one game entry identifies a single playing instance of the game, where the single playing instance of the game includes: i) a first selection to participate in a first drawing event, where the first selection identifies R numbers from a first pool of P numbers; ii) a second selection to participate in a second drawing event, where the second selection identifies Q numbers from a second pool of S numbers; iii) a third selection to participate in a third drawing event, where the third selection identifies T numbers from a third pool of U numbers; iv) a fourth selection to participate in a fourth drawing event, where the fourth selection identifies W numbers from a fourth pool of X numbers; and v) a fifth selection to participate in a fifth drawing event, where the fifth selection identifies Y numbers from a fifth pool of Z numbers; electronically determining, in real-time, based on at least one game mode, a plurality of winning results which include: i) at least one first winning result of the first drawing event, ii) at least one second winning result of the second drawing event, iii) at least one third winning result of the third drawing event, iv) at least one fourth winning result of the fourth drawing event, and v) at least one fifth winning result of the fifth drawing event; electronically determining, in real-time, at least one winning game entry from the game entries data, where the at least one winning game entry is a particular game entry in which: i) the first selection matches the at least one first winning result of the first drawing event, ii) the second selection matches the at least one second winning result of the second drawing event, iii) the third selection matches the at least one third winning result of the third drawing event, iv) the fourth selection matches the at least one fourth winning result of the fourth drawing event, and v) the fifth selection matches the at least one fifth winning result of the fifth drawing event; and electronically recording, in real-time, at least one portion of a jackpot to be distributed to a particular player associated with the at least one winning game entry.

BRIEF DESCRIPTION OF THE DRAWINGS

The present invention can be further explained with reference to the attached drawings, wherein like structures are referred to by like numerals throughout the several views. The drawings shown are not necessarily to scale, with emphasis instead generally being placed upon illustrating the principles of the present invention. Therefore, specific structural and functional details disclosed herein are not to be interpreted as limiting, but merely as a representative basis for teaching one skilled in the art to variously employ the present invention.

FIGS. 5-9B illustrate certain aspects of some embodiments of the present invention.

DETAILED DESCRIPTION OF THE INVENTION

Figure 1:
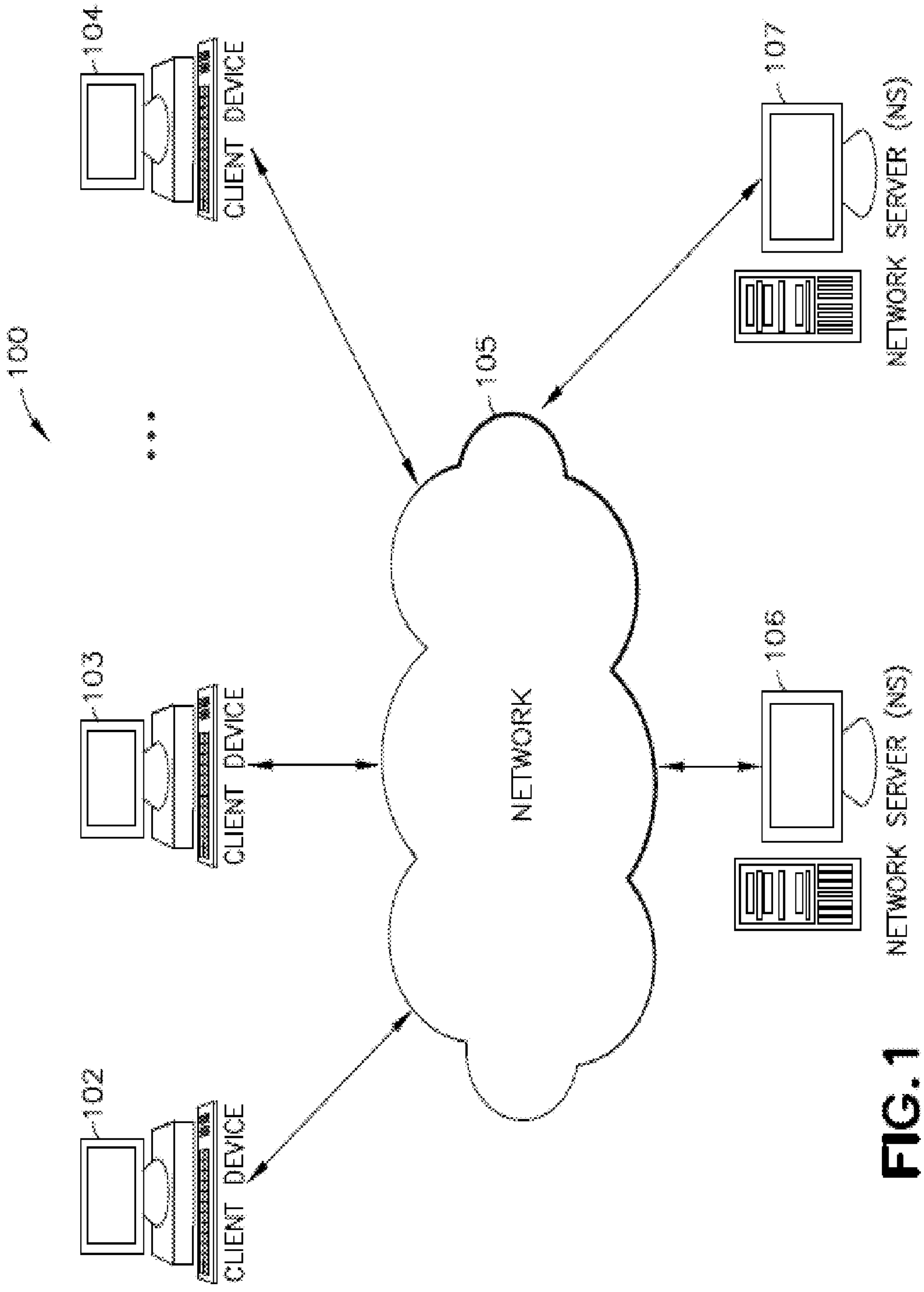
FIGS. 1-4 illustrate certain exemplary computer architecture in accordance with some principles of some embodiments of the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive.

Throughout the specification and claims, the following terms take the meanings explicitly associated herein, unless the context clearly dictates otherwise. The phrases “in one embodiment” and “in some embodiments” as used herein do not necessarily refer to the same embodiment(s), though it may. Furthermore, the phrases “in another embodiment” and “in some other embodiments” as used herein do not necessarily refer to a different embodiment, although it may. Thus, as described below, various embodiments of the invention may be readily combined, without departing from the scope or spirit of the invention.

In addition, as used herein, the term “or” is an inclusive “or” operator, and is equivalent to the term “and/or,” unless the context clearly dictates otherwise. The term “based on” is not exclusive and allows for being based on additional factors not described, unless the context clearly dictates otherwise. In addition, throughout the specification, the meaning of “a”, “an”, and “the” include plural references. The meaning of “in” includes “in” and “on”.

Furthermore, the term “player” is equivalent to the term “players” and both terms can be used alternatively without changing the meaning of the sentence, unless the context clearly dictates otherwise; similarly, the terms "winner" and "winners" are interchangeable, unless otherwise indicated.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. In some embodiments, the terms "instantaneous," "instantaneously," "instantly," and "in real time" refer to a condition where a time difference between a first time when a search request is transmitted and a second time when a response to the request is received is no more than 1 second. In some embodiments, the time difference between the request and the response is between less than 1 second and several seconds.

As used herein, the term "dynamic(ly)" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, the game-operating system(s) of the present invention can include the use of electronic mobile devices (e.g., smartphones, etc.) of players and server(s) in the distributed network environment, communicating over a suitable data communication network (e.g., the Internet, etc.) and utilizing at least one suitable data communication protocol (e.g., IPX/SPX, X.25, AX.25, AppleTalk, TCP/IP (e.g., HTTP), etc.).

In some embodiments, an exemplary game-operating system(s) can include the use of an electronic terminal(s), where the electronic terminal(s) can be any purpose terminal that transacts with individuals (e.g., a lottery terminal, a gaming terminal, a vending machine, a cashier register, an individual's mobile device being programmed to serve, as, for example, lottery and/or gaming terminal, etc.).

In some embodiments, the game-operating system(s) of the present invention is configured to deliver a game including: (i) a plurality of draw events designed to offer a multitude of winning opportunities/prizes (i.e. a set of draw events), and (ii) an opportunity to win a jackpot prize to a plurality of players (e.g., 10,000 players, 100,000 players, 1,000,000 players, 10,000,000 players, etc.), where the jackpot prize is awarded to at least one player of the plurality of players that has participated and won the top prize or a secondary prize in each draw event in the set of draw events. In some embodiments, the game is designed to promote continuous involvement of at least a portion of the plurality of players throughout the set of draw events by providing each of the plurality of players with a chance/opportunity to win in each draw event of the set of draw events, and awarding a jackpot prize after the last draw event of the set of draw events occurs.

In some embodiments, the game-operating method(s) of the present invention includes the following steps: identifying a set of draw events (e.g., but not limited to, 2, 3, 4, 5, 6, 7, 8, 9, 10, etc. draw events); determining a winning mode for each draw event of the set of draw events; conducting each draw event of the set of draw events; awarding at least one prize to at least one winner in each draw event; determining the level of a jackpot once all draw events in the set of draw events have been completed; awarding the jackpot if a winner of every draw event in the set of draw events is identified, or transferring (i.e., not awarding) the jackpot collected to a separate set of draw events if no winner of every draw event is identified.

In some embodiments, the game-operating system(s) are configured to deliver at least one draw event to each player of a plurality of players (e.g., but not limited to, at least 1,000 players, at least 10,000 players, at least 100,000 players, etc.) by use of a plurality of graphical user interfaces (GUIs) (e.g., but not limited to, at least 1,000 GUIs at least 10,000 GUIs, at least 100,000 GUIs, etc.).

In some embodiments, the game is configured to conduct a set of draw events, where the number of draw events in the set of draw events can range from 2-10 draw events. In some embodiments, the number of draw events of the set of draw events can range from 2-8. In some embodiments, the number of draw events of the set of draw events can range from 2-6. In some embodiments, the number of draw events of the set of draw events can range from 2-4. In some embodiments, the number of draw events of the set of draw events can range from 4-10. In some embodiments, the number of draw events of the set of draw events can range from 6-10. In some embodiments, the number of draw events of the set of draw events can range from 8-10. In some embodiments, the number of draw events of the set of draw events can range from 4-6. In some embodiments, the number of draw events of the set of draw events is 5. In some embodiments, the number of draw events in the set of draw events is determined prior to the start of the first draw event. In some embodiments, the number of draw events included in the set of draw events is identified after the start of the first draw event. In some embodiments, the number of the draw events in a set of draw events may vary depending on the needs of the local market in which the game is deployed, but may be kept in a level that will ensure both an attractive jackpot prize as well as the continuous engagement of the players.

Figure 8A:
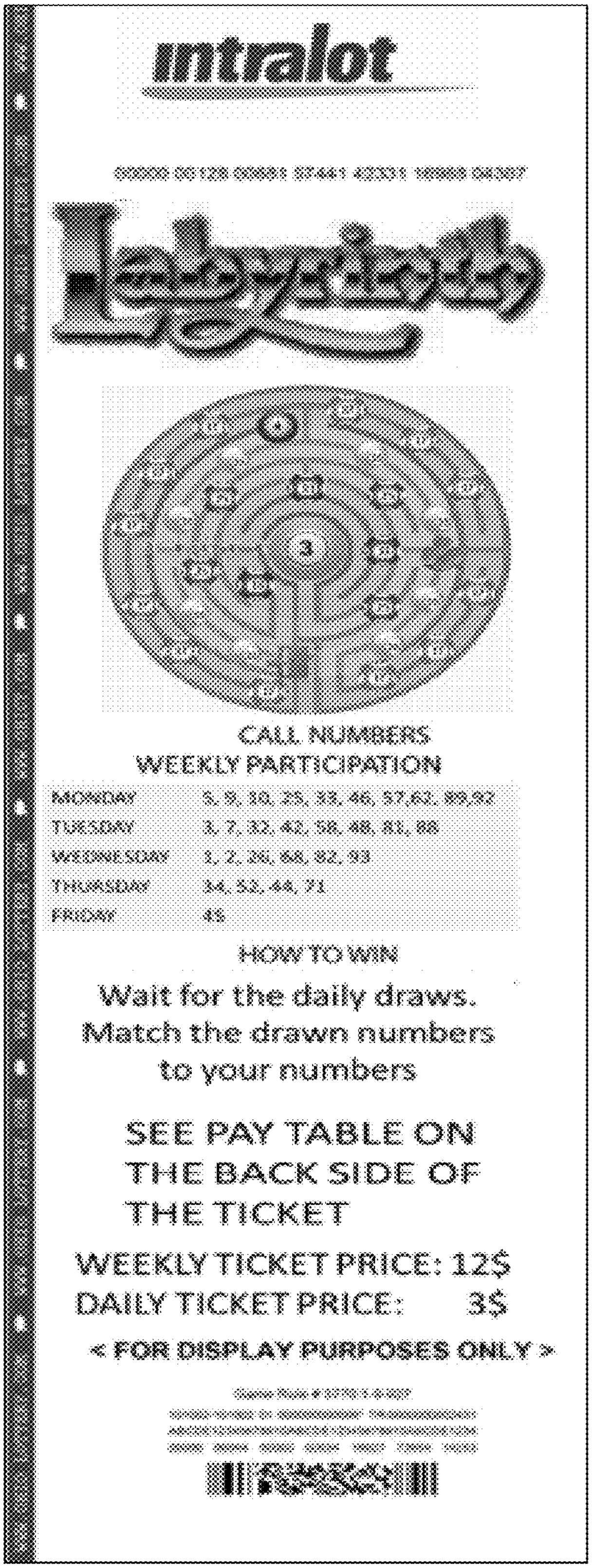
Figure 8B:

In some embodiments, each draw event is conducted independently (See, FIG. 8B). In some embodiments, a result of a draw event, e.g., a second draw event, depends on the results of a previous draw event, e.g., a first draw event. In some embodiments, the draw event includes the generation of a winning result specific to at least one player. In some other embodiments, the draw event includes the generation of a winning result specific to a subtotal of the participating players. In some other embodiments, the draw event includes the generation of a winning result for all participating players.

Figure 9A:
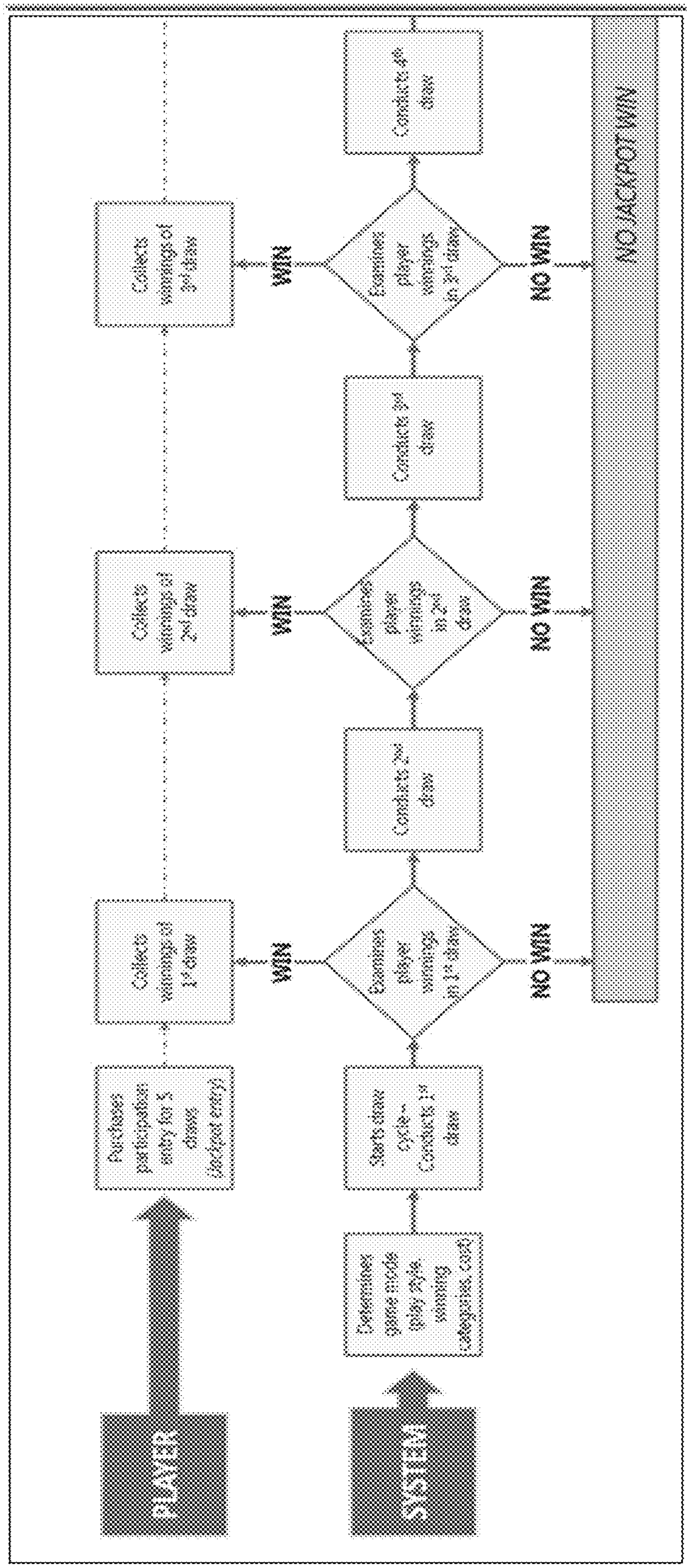
Figure 9B:
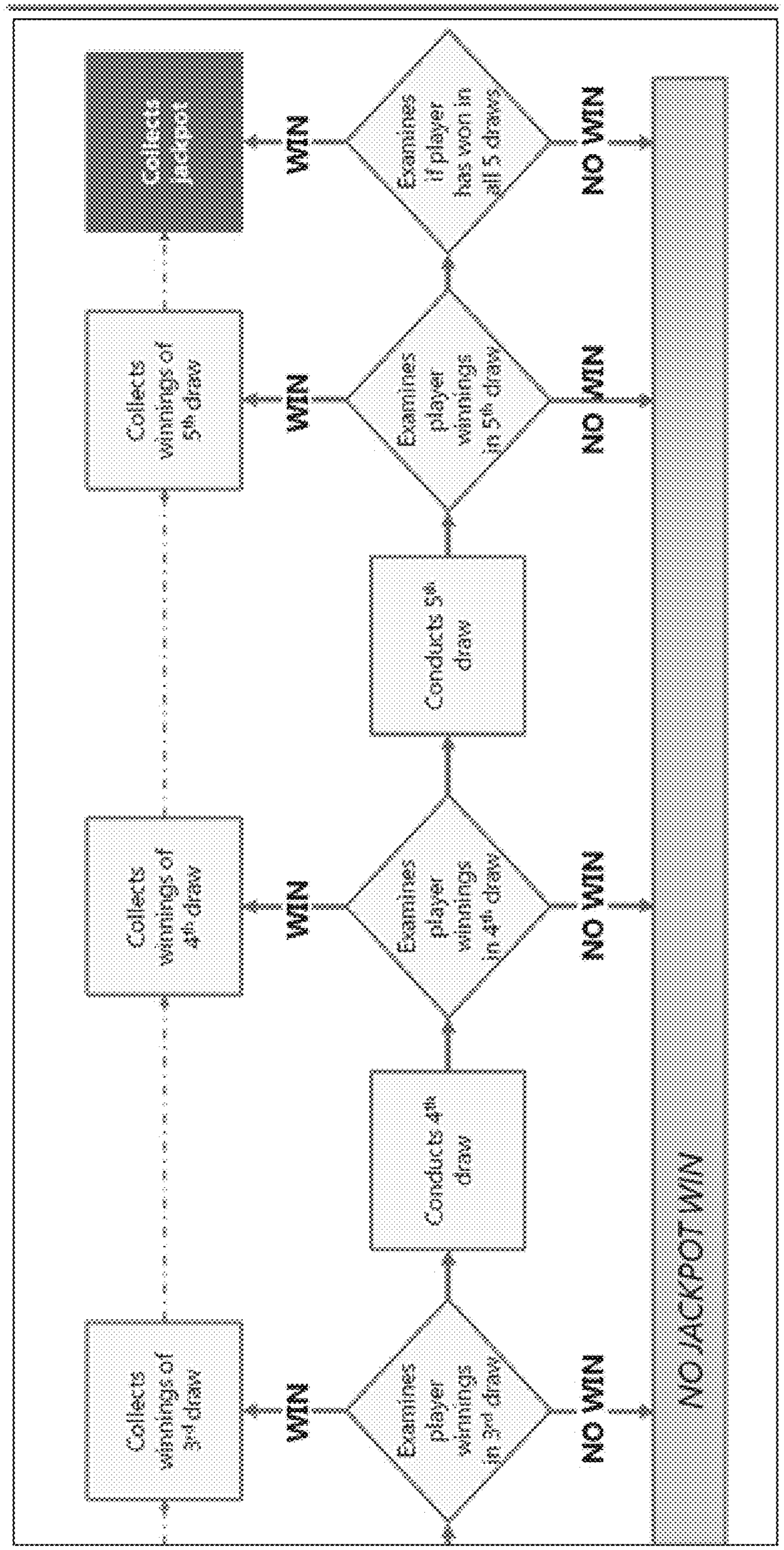

In some embodiments, the game-operating systems(s) of the present invention are configured to prompt the player to purchase at least one entry for each draw event included in a set of draw events, where purchasing at least one entry for the set of draw events allows the player to be eligible for the jackpot. In some embodiments, the game-operating system allows a player to purchase an individual entry for each draw event of the set of draw events (i.e., instead of purchasing one entry for all the draw events included in the set of draw events). In some embodiments, the player is required to purchase at least one entry for each draw event in a set of draw events prior to conducting the first draw event in order to be eligible to win the jackpot. In other embodiments, the player can purchase an entry for each of the draw events in a set of draw events prior to the conduction of each draw event in order to be eligible for the jackpot. FIG. 9 illustrates an embodiment of the game-operating system of the present invention, showing a jackpot winning mechanism.

In some embodiments, the cost for the set of draw events (i.e., in order for the player entry to be eligible for the jackpot) is equal to the sum of the costs for each draw event of the set of draw events (e.g., but not limited to, if one entry for one draw event costs $2.00, the total cost for the set of draw events is $10.00, in the case there are 5 draw events; or, alternatively, if the entry cost for the draw event 1 is $1.00, draw event 2 is $2.00, draw event 3 is $3.00, draw event 4 is $4.00, and draw event 5 is $5.00, entering the set of draw events costs $15.00 for a player). In some embodiments, the cost for the set of draw events (i.e., in order for a player's entry to be eligible for the jackpot) is higher than the sum of the costs for each draw event, and the excess is used to fund the jackpot (e.g., but not limited to: setting the cost of the set of draw events at $20.00, but the 5 draw events' costs are: draw event 1 costs $1.00, draw event 2 is $2.00, draw event 3 is $3.00, draw event 4 is $4.00, and draw event 5 $5.00 which total to $15.00, thus allowing for $5 to be collected to fund the jackpot). In some embodiments, the cost of the jackpot entry is lower than the sum of the costs for each draw event, designed in such a way so as to provide players additional value for participating in the game (e.g., but not limited to: if the entry cost for the set of draw events is set at $12.00, but the 5 draw events' cost is: $1.00 for the draw event 1, $2.00 for the draw event 2, $3.00 for the draw event 3, $4.00 for the draw event 4, and $5.00 for draw event 5, which total $15.00; in such case, the difference between the actual cost for the Lottery Operator and the cost for the player may be funded by non-game related funds, such as, but not limited to marketing budget, unclaimed prizes' fund, etc.).

In some embodiments, the winning mode is the same for all draw events. In some embodiments, the winning mode differs for each draw event. In some embodiments, each prize awarded to the winner(s) determined by the results of the draw event is defined/allocated prior to the draw event. In some embodiments, each prize awarded after each draw event is defined/allocated following the draw event, based on, but not limited to, the number of participating players and winners in the draw event.

In some embodiments, each draw event provides a plurality of winning opportunities (e.g., one top prize and at least one secondary prize category) so as to produce a plurality of winning players in each draw event. In some embodiments, the each winning player of the plurality of winning players is provided with a different winning prize (e.g., but not limited to, $20, $50, $1,000, etc.) that can depend on the prize category and/or the number of winning players in each prize category of the same draw event. In some embodiments, the at least two of the winners of the plurality of winners are provided with an identical prize (e.g., but not limited to, $20, $50, $1,000, etc.) that can depend on the prize category and/or the number of winning players in each prize category of the same draw event.

In some embodiments, the game-operating system(s) of the present invention is/are configured to allow a player to participate in every draw event of a set of draw events (e.g., but not limited to, all 5 draw events in a set of 5 draw events), where the player(s) is provided with an opportunity to win in each draw event of the set of draw events, and the player(s) who wins in each draw event of the set of draw events, is qualified to win all or a portion (e.g., but not limited to, 10%, 20%, 33%, 50%, 100%, etc.) of the jackpot.

In some embodiments, the jackpot is awarded after all draw events in the set of draw events have occurred, and at least one player has a winning ticket, where the winning ticket includes results indicating that the player won in each draw event of the set of draw events. In some embodiments, the jackpot is awarded when a player is identified as a winner in a sub-group of the set of draw events (e.g., if the game is designed with 5 draw events, and the assigned sub-group of the draw events eligible for the jackpot include draw events 1 through 3, and a player wins in the draw events 1, 2 and 3, then that winner will be identified and awarded the jackpot according to the embodiment herein). In some embodiments, the draw events are conducted until at least one jackpot winner is identified based on the predetermined criteria (i.e. having won a prize in each of the draw events in the set of draw events).

In some embodiments, the game-operating system presents the jackpot to at least one player having a ticket with a winning result in each of the draw events in the set of draw events. In some embodiments, the winning ticket can include at least a partial match of winning numbers (e.g., but not limited to, 3 out of 6 winning numbers, 4 out of 6 winning numbers, 5 out of 6 winning numbers thus resulting in the game-operating system awarding a secondary prize).

In some embodiments, the game-operating system of the present invention is configured to award the jackpot to at least one player (e.g., but not limited to, 1, 2, 3, 4, 5, 6, 7, 8, 9, 10, etc. players, depending on the number of players who successfully meet the jackpot winning criteria) with the highest number and difficulty level of winning results in the set of draw events. In some embodiments, difficulty levels are determined based on, but not limited to, the amount of numbers drawn in each draw event, the amount of total numbers available in each draw event, and the amount of numbers the player successfully matches with the ones drawn in each draw event. In an exemplary embodiment, the jackpot can be awarded to the player who won the top prize in, e.g., 4 out of the 5 draw events, and will not be awarded to the player(s) who won secondary prize(s) in, e.g., 4 out of the 5 draw events. In some embodiments, all winners of an equal number of draws are awarded substantially the same or a proportional fraction of the jackpot, depending on the difficulty level of the draw events (e.g., but not limited to, if difficulty levels are identified in a range of 1-5, with 5 being the most difficult, then a player winning at difficulty level 3 will receive, e.g., 33% of the jackpot fraction and the player winning at difficulty level 5 will receive, e.g., 66% of the jackpot fraction).

In some embodiments, the present invention refers to a new lottery game. In some embodiments, the present invention refers to a modification/enhancement of an existing game, and/or the combination of at least two existing games into a single game offering, with the necessary modifications.

In some embodiments, the game is configured to deliver a story-type draw presentation related to the set of draw events to the plurality of players. In some other embodiments, the game-operating system is configured to deliver the game's draw results in the same manner as the other Lottery games in the market where the game is introduced (e.g., but not limited to, simple number draw presentation).

Figure 8C:
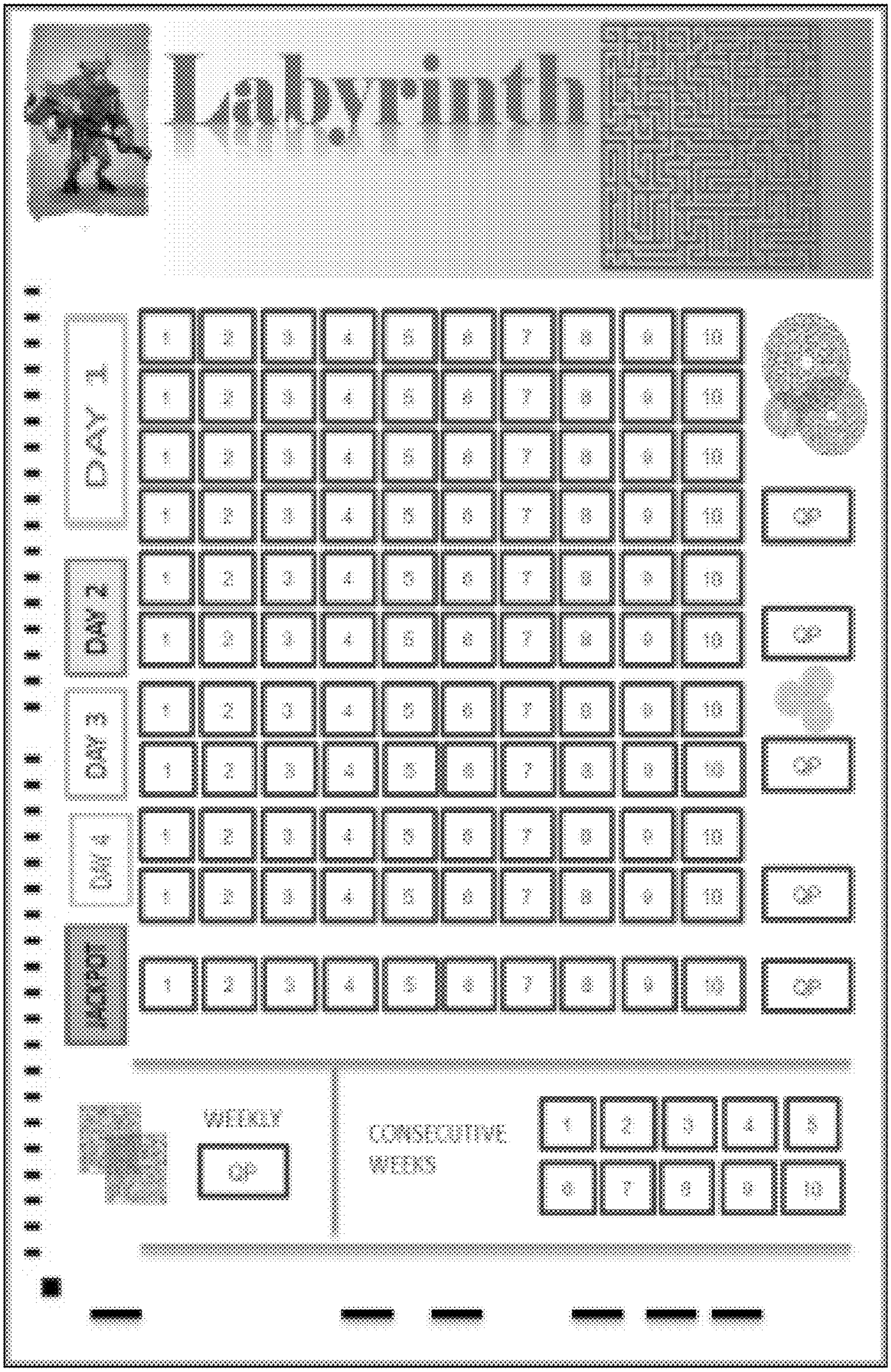

FIGS. 8A-8C are embodiments of the game-operating systems of the present invention, illustrating: (8A) a ticket eligible for 5 draw events (i.e., a set of draw events), thus qualified for a jackpot participation; (8B) a ticket for a single draw event; and (8C) a playslip, where the player(s) can make their own selections regarding their participation in the game.

Example: Pre-Launch Configuration Mode

In an exemplary embodiment, the game-operating system(s) of the present invention is configured to provide a Lottery operator selections for determining the following game parameters:

(1) The Play Style

In some embodiments, the game-operating system(s) of the present invention is configured to allow the Lottery Operator to select a game mode, where the game mode may be the same for each draw, or vary in difficulty (e.g., increasing or decreasing difficulty as the set of draw events progresses). In an exemplary embodiment, the game mode selected could be a lotto 6/49 game, where the player will have to select 6 numbers out of a pool of 49, and match at least 2 numbers drawn during a series of 5 draw events in order to win the jackpot.

(2) The Winning Mode

In some embodiments, the game-operating system(s) of the present invention is configured to select a winning mode, where the winning mode may be different or the same for the number of draw events of the set of draw events. In some embodiments, the wining mode may include a plurality of winning categories and/or prizes, which can be the same or differ for the number of draw events. In some embodiments, prizes in connection with each draw event may be: (i) fixed/predetermined, thus known to the players in advance, or (ii) pooled, thus dependent on the sales of the draw event(s) and/or set of draw events.

(3) Price Per Draw and Jackpot Participation

In some embodiments, the game-operating system(s) of the present invention is configured to assign the same cost for the participation in each of the draw events of a set of draw events. In some other embodiments, the game-operating system(s) is configured to assign different costs for the participation in each of the draw events of a set of draw events. In some embodiments, the game-operating system(s) can receive a plurality of payments for the jackpot participation, where the plurality of payments could be equal, higher, or lower to the sum of the cost of individual draw events of the set of draw events. In some embodiments, the game-operating system is configured to receive an input regarding the parameters of lottery payment from the Lottery Operator.

(4) The Number and Frequency of Draw Events

In some embodiments, the game-operating system(s) of the present invention is configured to include at least 2 draw events, where the at least 2 draw events are designed to maintain/motivate a plurality of players so as to not lose interest over the duration of the set of draw events, which could last, e.g., but not limited to, a year, a month, a week, or more often (i.e. instantly, specific to a single player), as programmed by the Lottery Operator.

(5) Jackpot Participation and Win

In some embodiments, the game-operating system(s) of the present invention is configured to allow players to be eligible for the jackpot by: (a) purchasing a ticket eligible for all draw events prior to the beginning of the set of draw events, and/or (b) participating in an on-going basis, purchasing entries for each draw separately, depending on the previous draw results. In other embodiments, the game-operating system(s) is configured to allow players to be eligible for the jackpot only in the case they purchase a ticket for all draw events prior to the initiation of the set of draw events (i.e. not in the case of participating in an on-going basis, purchasing entries for each draw separately, depending on the previous draw results). In some embodiments, the game-operating system(s) of the present invention is configured to award a jackpot to a winner(s) having won in each draw event of the set of draw events, in addition to or instead of the single draw prizes awarded in each draw event of the set of draw events.

(6) Jackpot Fund

In some embodiments, the jackpot can be funded by: (a) withholding a portion of the price paid by each participating player per draw event and directing the withheld portion to the jackpot fund, thus funding the jackpot with the contribution of all players; (b) establishing the price for jackpot participation higher than the sum of the cost of individual draw events, thus funding the jackpot specifically from the jackpot players' participation; (c) utilizing funds from other sources of revenue (e.g., but not limited to, external sources which can include, e.g., transferring funds from other games, utilizing the Lottery Operator prize fund, obtaining a promotional budget, utilizing the unclaimed prizes' fund, etc., or any combination thereof), or any combination thereof. FIGS. 6A-6B illustrate some embodiments of the game-operating system of the present invention. FIG. 6A illustrates an embodiment, depicting a game mode designed to offer high jackpots. FIG. 6B illustrates an embodiment, depicting a game mode designed to put emphasis on the individual draw event prizes.

(7) Draw Method

In some embodiments, the game-operating method(s) of the present invention include: (a) RNG (random number generator), so as to randomly draw game indicia out of: (i) all possible combinations of game indicia, or (ii) a subtotal of all possible combinations of game indicia, which subtotal can be pre-determined in the game-operating system or designed to depend on the game sales, thus effectively increasing or decreasing the number of winners of each draw event of a set of draw events, or (b) traditional drawing machine, or (c) any combination thereof.

(8) Draw Presentation

In some embodiments, the game-operating systems(s) of the present invention is configured to include an interesting motif representative of the game's objective, such as, but not limited to, a labyrinth, leaderboard, road, target, etc. In other embodiments, the game-operating system(s) is configured to utilize similar draw presentation as the other Lottery games in the same market.

(9) Enhancement Options

In some embodiments, the game-operating systems(s) of the present invention is configured to include at least one enhancement option(s) at any time of the game, e.g., but not limited to, during the game launch, where the at least one enhancement option(s) is configured to attract a specific player demographic (e.g., but not limited to, 35-50 year old individuals). In some embodiments, the at least one enhancement option(s) is configured to incentivize player(s) at later stages of the game, e.g., when the game reaches a specified level of maturity as measured by sales and/or participation levels, which can occur after 2-3 years in operation, to reward loyal players and/or make the game appealing to a new player group. In some embodiments, the game enhancements can include, but are not limited to: (a) the draw of a Bonus ball, offering "One Extra free number for that day", (b) a Lucky symbol in order to provide players "one winning number until the end of the set of draw events", (c) a Door symbol presenting a "free entry for the next day", (d) consolidation prizes based on the winning string of the players, e.g., but not limited to, a special jackpot draw at the end of the year for the players having accumulated the highest number of winning draw events without winning a jackpot, etc., or (e) any combination thereof.

(10) The Sales Network for Accessing the Game

In some embodiments, the game-operating systems(s) of the present invention are configured to be distributed through all available Lottery distribution channels (i.e. land-based network, internet, mobile, etc.) with the appropriate diversification of delivery methods to best suit the selected channel. In some embodiments, the Mobile platform is configured to offer the opportunity for creative presentations of the game, the draw event, the different bonus schemes applied, or any combination thereof. In some embodiments, the animations and/or the modern design of the game are designed to increase player enjoyment.

Figure 5:
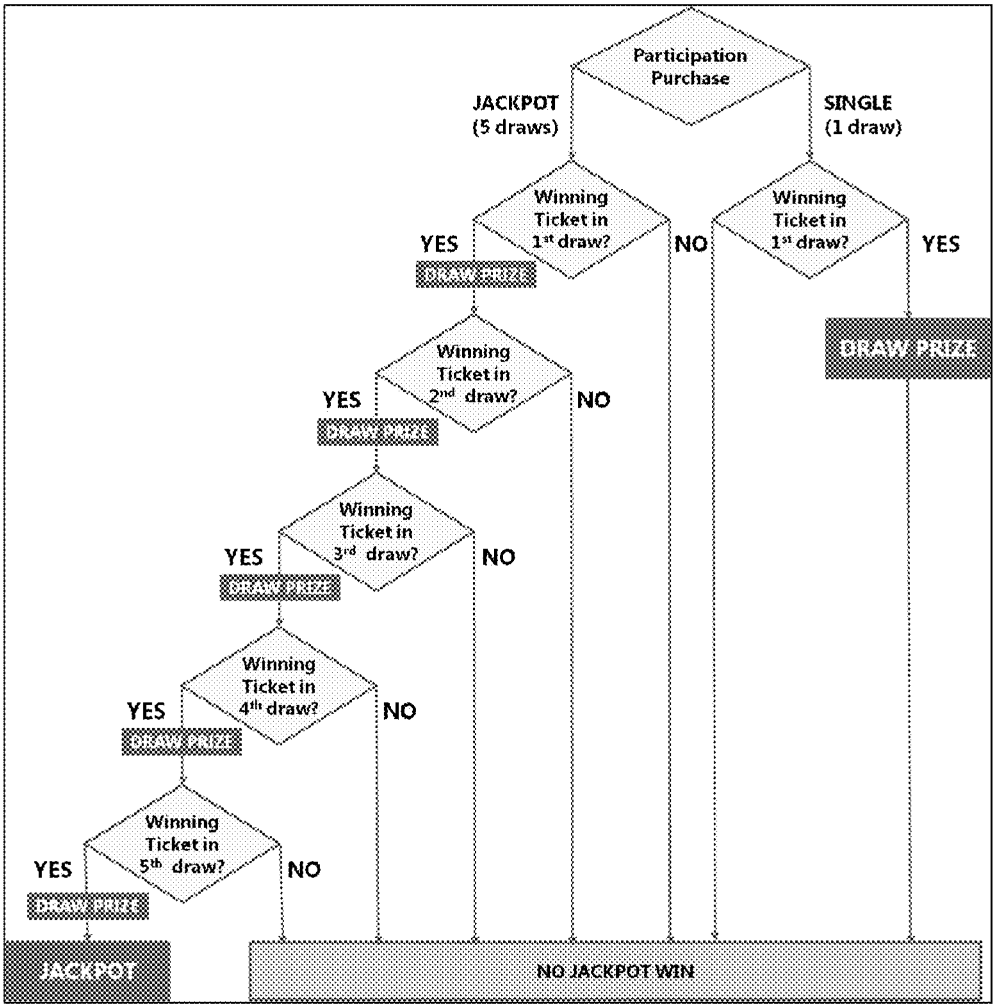

Example of Player Participation in the Game (1) The game-operating systems(s) of the present invention is configured to dispense a ticket to the player once they purchase an entry to the game, where the ticket indicates the number of draw events input by the player, where the input of draw events can be either (a) a single draw participation or (b) participation in the full set of draw events, where such participation is eligible for the jackpot. In some embodiments, the player can select their number combination(s) for all or a subtotal of the selected number of draw events. In some embodiments, the system randomly picks the numbers for the player for all or a subtotal of the selected number of draw events. In some embodiments, when the system receives an input from a player who participates in a single draw, the system is configured to allow a player to only be eligible to win a prize in connection with the single draw event selected, and the system does not allow the player to participate for the jackpot. FIG. 5 illustrates an exemplary embodiment of the game-operating system as described herein.

(2) In some embodiments, the game-operating system of the present invention is configured to conduct the number of draw events predetermined in the time frame designed. In a non-limiting exemplary embodiment, the system is configured to provide 5 draw events having one day intervals (for a total of 5 days). In some embodiments, the game-operating system is configured to generate a predetermined amount of winning numbers for each draw event of the set of draw events.

(3) In some embodiments, based on the results of each draw, the draw winners and assigned prizes are determined. In some embodiments, the game-operating system of the present invention is configured to identify a plurality of players that match at least one designated amount of winning numbers in a single draw are awarded the assigned prizes.

(4) In some embodiments, the game-operating system of the present invention is configured to identify the player or plurality of players who "pass through" all draw events of the set of draw events (i.e. by winning a prize in each of the available draw events) and awards to the player(s) the jackpot prize assigned after the last draw event (e.g., after the $5^{th}$ draw event in the case of a set of 5 draw events). In some embodiments, when no jackpot winner is identified by the game-operating system of the present invention, the game-operating system is configured to add the collected jackpot to a subsequent set of draw events (i.e. jackpot roll-over for the next set of draw events), increasing the size and attractiveness of the jackpot.

Indicative Game Mode 1 (Different Game Modes Per Draw Event)

(1) In some embodiments, the game-operating system(s) of the present invention is configured to allow a plurality of players to purchase a jackpot ticket, by, e.g., but not limited to, (a) receiving selected numbers from at least one player of a plurality of players, or (b) randomly selecting numbers to provide to at least one player of a plurality of players, and providing to each player a ticket which bares number combinations equal to the number of draw events required for being eligible for a jackpot prize, e.g., but not limited to, 3, 4, 5, 6, 7, etc. In some embodiments, in each draw, the game-operating system of the present invention is configured to allow a player to participate with a different number combination selected from a different pool of numbers, specific to each draw event. In an exemplary embodiment, the game-operating system(s) of the present invention is configured to allow a player to purchase a ticket for only one draw event, and, in this example, the player is eligible for the prizes in connection with this player-selected draw event, and the player is not eligible for the jackpot.

(2) In some embodiments, the game-operating system of the present invention is configured to conduct the $1^{st}$ draw event, e.g. drawing of 24 numbers out of the 100 available numbers.

(3) In some embodiments, the game-operating system of the present invention is configured to identify a winning player(s), where the winning player(s) matches, e.g., but not limited to, 10 numbers in order to win the top prize of the draw event, or, e.g., but not limited to, 9, 8, 7, 6, or 5 numbers to win a secondary prize(s). In some embodiments, the game-operating system of the present invention is configured to award a prize(s) to a player(s) having matched the assigned amount of number, e.g., number matches of 5-10 numbers, and allows the awarded player(s) to be eligible to win a jackpot. In some embodiments, the game-operating system can award at least one prize in later draw events to a player who receives a non-winning result in this draw event and thus misses the opportunity to win the jackpot. In some embodiments, the player's participation ends if the player has selected to participate only in this single draw event (i.e. the player has purchased an entry for this draw event only).

(4) In some embodiments, the game-operating system of the present invention is configured to conduct a second draw event, e.g., drawing of 16 numbers out of the 80 available numbers.

(5) In some embodiments, the game-operating system of the present invention is configured to award (i) a top prize(s) of the draw event to a player(s) having matched 8 numbers, and (ii) a secondary prize(s) to a player(s) having matched 7, 6, 5 or 4 numbers. In some embodiments, when a player wins any of the prizes (e.g., a top prize or a secondary prize), the player collects that prize. In some embodiments, when a player(s) has won in both of the conducted draw events (i.e., the first draw event and the second draw event), the player(s) is eligible to win a jackpot. In some embodiments, the game-operating system can award at least one prize in later draw events to a player who receives a non-winning result in this draw event and thus misses the opportunity to win the jackpot. In some embodiments, the player's participation ends if the player has selected to participate only in this single draw event (i.e. the player has purchased an entry for this draw event only).

(6) In some embodiments, the game-operating system of the present invention is configured to conduct a third draw event, e.g., drawing of 10 numbers out of the 60 available numbers.

(7) In some embodiments, the game-operating system of the present invention is configured to award (i) a top prize(s) of the draw event to a player(s) having matched 6 numbers, and (ii) a secondary prize(s) to a player(s) having matched 5, 4 or 3 numbers. In some embodiments, when a player(s) has won in all three of the conducted draw events (i.e., the first draw event, the second draw event, and the third draw event), the player(s) is eligible to win a jackpot. In some embodiments, the game-operating system can award at least one prize in later draw events to a player who receives a non-winning result in this draw event and thus misses the opportunity to win the jackpot. In some embodiments, the player's participation ends if the player has selected to participate only in this single draw event (i.e. the player has purchased an entry for this draw event only).

(8) In some embodiments, the game-operating system of the present invention is configured to conduct a fourth draw event, e.g. drawing of 5 numbers out of the 40 available numbers.

(9) In some embodiments, the game-operating system of the present invention is configured to award (i) a top prize(s) of the draw event to a player(s) having matched 3 numbers, and (ii) a secondary prize(s) to a player(s) having matched 2 numbers. In some embodiments, when a player(s) has won in all four of the conducted draw events (i.e., the first, second, third, and fourth draw events) the player(s) is eligible to win a jackpot. In some embodiments, the game-operating system can award at least one prize in later draw events to a player who receives a non-winning result in this draw event and thus misses the opportunity to win the jackpot. In some embodiments, the player's participation ends if the player has selected to participate only in this single draw event (i.e. the player has purchased an entry for this draw event only).

(10) In some embodiments, the game-operating system of the present invention is configured to conduct the fifth and last draw event for this indicative example, e.g., drawing of 1 number out of the 20 available numbers.

(11) In some embodiments, the game-operating system of the present invention is configured to award (i) a top prize(s) of the draw event to a player(s) having matched the 1 number drawn. In some embodiments, the player is awarded the prize, and if he has won in all five of the conducted draw events, the player is awarded the jackpot or a portion of the jackpot collected in the case of more than one eligible winner.

FIG. 6A illustrates an embodiment of the game-operating system of the present invention as described in the paragraphs above.

Indicative Game Mode 2 (Single Game Mode)

(1) In some embodiments, the game-operating system(s) of the present invention is configured to allow a plurality of players to purchase a jackpot ticket, by, e.g., but not limited to, (a) receiving selected numbers from at least one player of a plurality of players, or (b) randomly selecting numbers to provide to at least one player of a plurality of players, and providing to each player a ticket which bares a single number combination eligible for the number of draw events required for being eligible for the jackpot prize, e.g., but not limited to, 3, 4, 5, 6, 7, etc. In each draw, the player participates with the assigned number combination. In an exemplary embodiment, the game-operating system(s) of the present invention is configured to allow a player to purchase a ticket for only one draw event, and, in this example, the player is eligible for the prizes in connection with the selected draw event, and the player is not eligible for the jackpot.

(2) In some embodiments, the game-operating system of the present invention is configured to conduct the $1^{st}$ draw event, e.g., drawing of 5 numbers out of the 50 available numbers.

(3) In some embodiments, the game-operating system of the present invention is configured to identify a winning player(s), where the winning player(s) matches, e.g., but not limited to, at least one number in order to win a prize for the draw event. In some embodiments, if the player wins a prize, he collects it, and is eligible to win the jackpot. In some embodiments, the game-operating system can award at least one prize in later draw events to a player who receives a non-winning result in this draw event and thus misses the opportunity to win the jackpot. In some embodiments, the player's participation ends if the player has selected to participate only in this single draw event (i.e. the player has purchased an entry for this draw event only).

(4) In some embodiments, the game-operating system of the present invention is configured to conduct a second draw event, e.g., drawing of a new set of 5 numbers out of the 50 available numbers.

(5) In some embodiments, the game-operating system of the present invention is configured to award a prize(s) to the player(s) having matched at least 2 numbers in the draw event. In some embodiments, when a player wins a prize, the player collects this prize. In some embodiments, when a player(s) has won in both of the conducted draw events (i.e., the first draw event and the second draw event) the player(s) is eligible to win a jackpot. In some embodiments, the game-operating system can award at least one prize in later draw events to a player who receives a non-winning result in this draw event and thus misses the opportunity to win the jackpot. In some embodiments, the player's participation ends if the player has selected to participate only in this single draw event (i.e. the player has purchased an entry for this draw event only).

(6) In some embodiments, the game-operating system of the present invention is configured to conduct a third draw event, e.g., drawing of a new set of 5 numbers out of the 50 available numbers.

(7) In some embodiments, the game-operating system of the present invention is configured to award (i) a top prize(s) of the draw event to a player(s) having matched 3 numbers, and (ii) a secondary prize(s) to a player(s) having matched 2 numbers. In some embodiments, when a player wins any of the prizes, the player collects that prize. In some embodiments, when a player(s) has won in all three of the conducted draw events (i.e., the first draw event, the second draw event, and the third draw event) the player(s) is eligible to win a jackpot. In some embodiments, the game-operating system can award at least one prize in later draw events to a player who receives a non-winning result in this draw event and thus misses the opportunity to win the jackpot. In some embodiments, the player's participation ends if the player has selected to participate only in this single draw event (i.e. the player has purchased an entry for this draw event only).

(8) In some embodiments, the game-operating system of the present invention is configured to conduct a fourth draw event, e.g., drawing of a new set of 5 numbers out of the 50 available numbers.

(9) In some embodiments, the game-operating system of the present invention is configured to award (i) a top prize(s) of the draw event to a player(s) having matched 4 numbers, and (ii) a secondary prize(s) to a player(s) having matched 3 or 2 numbers. In some embodiments, if the player wins any of the prizes, the player collects that prize. In some embodiments, when a player(s) has won in all four of the conducted draw events (i.e., the first, second, third, and fourth draw events) the player(s) is eligible to win a jackpot. In some embodiments, the game-operating system can award at least one prize in the later draw event to a player who receives a non-winning result in this draw event and thus misses the opportunity to win the jackpot. In some embodiments, the player's participation ends if the player has selected to participate only in this single draw event (i.e. the player has purchased an entry for this draw event only).

(10) In some embodiments, the game-operating system of the present invention is configured to conduct the fifth and last draw for this indicative example, e.g., drawing of a new set of 5 numbers out of the 50 available.

(11) In some embodiments, the game-operating system of the present invention is configured to award (i) a top prize(s) of the draw event to a player(s) having matched 5 numbers, and (ii) a secondary prize(s) to a player(s) having matched 4, 3 or 2 numbers. In some embodiments, the player is awarded a prize, the player collects that prize, and if the player has won in all five of the conducted draw events, the player is awarded the jackpot.

FIG. 7 illustrates an embodiment of the game-operating system of the present invention as described in the paragraphs above.

In some embodiments, the game-operating system of the present invention may be configures to exclude the number (s) previously drawn in the earlier draw events of the set of draw events, such that, e.g., the draw sequence will be: (i) $1^{st}$ draw event: one number drawn out of 50 available numbers; (ii) $2^{nd}$ draw event: two numbers drawn out of the pool of the 49 remaining numbers after the previously drawn 1 number in the first draw event; (iii) $3^{rd}$ draw event: three numbers drawn out of the pool of the 47 remaining numbers after the first two draw events (1 number drawn in the first, and 2 numbers drawn in the second draw event); (iv) $4^{th}$ draw event: four numbers drawn out of the pool of the 44 numbers remaining after the first three draw events (1 number drawn in the first, 2 numbers drawn in the second, and 3 numbers drawn in the third draw event); (v) $5^{th}$ draw event: five numbers drawn out of the pool of the 40 numbers remaining after the first four draw events (1 numbers drawn in the first, 2 numbers drawn in the second, 3 numbers drawn in the third, and 4 numbers drawn in the fourth draw event). This exemplary embodiment of the game-operating system of the present invention results in improved odds of winning thus more winners are generated in each draw event of the set of draw events as well as for the jackpot.

Indicative Game Mode 3 (Always a Winner)

(1) In some embodiments, the game-operating system(s) of the present invention is configured to allow a plurality of players to purchase a jackpot ticket, by, e.g., but not limited to, (a) receiving selected numbers from at least one player of a plurality of players, or (b) randomly selecting numbers to provide to at least one player of a plurality of players, and providing to each player a ticket which bares number combinations equal to the number of draw events required for being eligible for the jackpot, e.g., but not limited to, 3, 4, 5, 6, 7, etc. In some embodiments, the game-operating system(s) of the present invention is configured to allow a player to purchase a ticket for only one draw event, in which case, the player is eligible to win a prize in connection with this selected draw event only, and the player is not eligible for the jackpot. In some embodiments, the player can participate for the jackpot by purchasing on-the-go entries for each of the available draw events in a set of draw events. In some embodiments, where a player individually purchases an entry for each draw event of a set of draw events and wins in each individually purchased draw event entry, the player is eligible to win the jackpot or a fraction of the jackpot at the end of the set of draw events.

(2) In some embodiments, the game-operating system(s) of the present invention is configured to award a jackpot to a player(s) who has won in a set of draw events (e.g., but not limited to, a set of 5 draw events). In some embodiments, the game-operating system is configured to conduct draw events until a jackpot winner is found (i.e. a player(s) wins in the specified number of draw events; e.g., but not limited, at least one player wins in 5 draw events, whether consecutive or non-consecutive).

In an exemplary embodiment, each draw event result can be independent and can result in the selection of an equal amount of numbers drawn out of similar pool of numbers (e.g. but not limited to, 6 numbers can be drawn out of a pool of 49 numbers for each draw event).

(3) In some embodiments, the game-operating system of the present invention is configured to award (i) a top prize(s) of the draw event to a player(s) having matched 6 numbers, and a secondary prize(s) to a player(s) having matched 5, 4, or 3 numbers. In some embodiments, when a player(s) has won in the required number of conducted draw events (e.g., but not limited to, 5 draw events), the player(s) is eligible to win a jackpot. In some embodiments, the game-operating system can award at least one prize in later draw events to a player who receives a non-winning result in a single draw event and thus misses the opportunity to win the jackpot. In some embodiments, the player's participation ends if the player has selected to participate only in this single draw event (i.e. the player has purchased an entry for this draw event only).

(4) In some embodiments, the game-operating system of the present invention continues to conduct draws until a jackpot winner (e.g., but not limited to, a winner of 5 draws) is identified. In some embodiments, the number of draw events required to find a jackpot winner could determine the level of the jackpot won, either lowering the jackpot prize each time the jackpot is not won after the fifth draw event, or increasing the jackpot proportionately to ticket sales (e.g., in an effort to attract more players).

The following exemplary embodiments are provided to further illustrate the game-operating system of the present invention.

Example 1: Jackpot Vs Single Participation

As an example of an embodiment of the game-operating system of the present invention, John, Robert and Mary participate in a game independently. In this exemplary embodiment, the game is designed with a set of 5 draw events, participation in each is priced at $1. In this exemplary embodiment, the first draw event includes drawing 24 numbers out of a pool of 100 available, the second drawing 16 numbers out of a pool of 80, the third drawing 10 numbers out of 60, the fourth drawing 5 numbers out of 40, and the fifth drawing a single number out of 20 available (as presented in the FIG. 6A).

John and Robert purchase a ticket eligible for the set of 5 draw events, while Mary participates with a single draw ticket. In this case, only John and Robert are eligible for the jackpot, while Mary can only receive the potential winnings from the single draw event in which she participates.

In this indicative example, the inventive computer-operating system generates and delivers a ticket to John and a ticket to Robert, where the tickets each contain 5 different number combinations, each eligible for a single draw event [one containing 10 randomly drawn numbers out of a pool of 100 (10/100), one containing 8 numbers out of a pool of 80 (8/80), one with 6 numbers drawn out of 60 (6/60), one with 3 numbers out of 40 (3/40), and one with a single number out of 20 available (1/20), as per the game rules], and they pay $5 in total–$1 for each number combination they participate with. Mary pays $1 and receives one randomly selected number combination of 10 numbers out of the 100 possible, eligible for the $1^{st}$ draw event.

During the first draw event, 24 numbers are drawn out of a pool of 100 numbers. All three, John, Robert and Mary, check their tickets for a potential winning combination. In the indicative example, they need to match 10 numbers in order to win the top prize for the draw event, and 9, 8, 7, 6, or 5 numbers to win any of the secondary prizes. For the needs of this example, John matches 7 numbers and wins $30, Robert matches only 2 numbers and thus receives no prize (based on the winning mode of the examined game), and Mary matches 6 numbers and wins $5. In this case, John is still in the run for the jackpot, while Robert, although he misses the opportunity to win the jackpot (i.e. he failed to win a prize in this draw event), can still win a prize in the following draw events. Mary's participation in the game has ended, unless she selects to purchase a ticket for the next draw event as a single participation.

The system conducts the second draw event, drawing 16 numbers out of the 80 available. John and Robert check their tickets for a potential winning combination. In the indicative example, they need to match 8 numbers in order to win the top prize for the draw event, and 7, 6, 5 or 4 numbers to win any of the secondary prizes. For the needs of the example, John matches 7 numbers and wins $5,000 (i.e. he is still eligible for the jackpot after 2 successful draw events), and Robert matches 8 numbers and wins $100,000. Mary is not participating in this draw event (i.e. she has not purchased an entry).

The third draw event produces 10 numbers out of the 60 available. In the indicative example, the players need to match 6 numbers in order to win the top prize assigned to the draw event, and 5, 4 or 3 numbers to win any of the secondary prizes. For the needs of the example, John matches 5 numbers and wins $500 (i.e. he is still eligible for the jackpot after 3 successful draw events), and Robert does not match any number, thus receives no prize. Mary is not participating in this draw (i.e. she has not purchased an entry).

Before the 4$^{th}$ draw event, Mary decides to re-enter the game, and purchases a single-draw ticket for the upcoming draw event that costs $1 and contains 3 numbers out of 40 (3/40). With this participation, Mary is eligible for the prizes of the 4$^{th}$ draw event (i.e. the one she purchases an entry for), but not for the jackpot.

The fourth draw event produces 5 numbers out of the 40 available. The players need to match 3 numbers in order to win the top prize for the draw event, and 2 numbers to win the secondary prize. John and Mary match 3 numbers and receive $400 each (only John is eligible for the jackpot, due to his win in 4 draw events), and Robert matches 1 number and does not receive a prize.

The system conducts the fifth and final draw event for this indicative example, drawing 1 number out of the 20 available. The players need to match 1 number in order to win the prize for the draw event. For the needs of this example, both John and Robert have matched the drawn number thus win $10 each. In addition to his winnings from the fifth draw event, John, having won a prize in all 5 draw events, receives the jackpot collected for this set of 5 draw events. Mary is not participating in this draw event (i.e. she has not purchased an entry).

In the end of this set of 5 draw events:

John has participated in all 5 draw events, has paid $5 (i.e. $1 for each draw event), and has won $5,940 (i.e. $30 in the 1$^{st}$ draw event, $5,000 in the 2$^{nd}$ draw event, $500 in the 3$^{rd}$ draw event, $400 in the 4$^{th}$ draw event, and $10 in the 5$^{th}$ draw event) as well as the available jackpot, Robert has participated in all 5 draw events, has paid $5 (i.e. $1 for each draw event), and has won $100,010 (i.e. $0 in the 1$^{st}$ draw event, $100,000 in the 2$^{nd}$ draw event, $0 in the 3$^{rd}$ draw event, $0 in the 4$^{th}$ draw event, and $10 in the 5$^{th}$ draw event). He is not eligible for the jackpot because he lost in the first draw event, and Mary has participated in 2 draw events (i.e. 1$^{st}$ and 4$^{th}$), has paid $2 (i.e. $1 for each participating draw) and has won $405 (i.e. $5 in the 1$^{st}$ draw event, and $400 in the 4$^{th}$ draw event).

Example 2: Multi-Draw Versus Single Draw Participation

As an example of a single embodiment of the present invention, let assume that Oliver, Emily and Michael decide to participate in the game independently. In this exemplary embodiment, the game is designed with a set of 5 draw events, participation in each is priced at $1. In this exemplary embodiment, the first draw event includes drawing 24 numbers out of a pool of 100 available, the second drawing 16 numbers out of a pool of 80, the third drawing 10 numbers out of 60, the fourth drawing 5 numbers out of 40, and the fifth drawing a single number out of 20 available (as presented in the FIG. 6A).

Oliver decides to purchase a ticket eligible for the set of 5 draw events, while Emily and Michael both participate with a single draw ticket. In this case only Oliver will be eligible for the jackpot, while Emily and Michael will only receive the potential winnings from the single draw event they participate in.

In this indicative example, Oliver receives a ticket containing 5 different number combinations, each combination eligible for each participating draw event [one containing 10 randomly drawn numbers out of a pool of 100 (10/100), one containing 8 numbers out of a pool of 80 (8/80), one with 6 numbers drawn out of 60 (6/60), one with 3 numbers out of 40 (3/40), and one with a single number out of 20 possible (1/20)], and pays $5 in total–$1 for each number combination he participates with. Emily and Michael pay $1 and each receives a randomly selected number combination of 10 numbers out of the 100 possible, eligible for the 1$^{st}$ draw event.

During the first draw event, 24 numbers are drawn out of a pool of 100 numbers. All three, Oliver, Emily and Michael, check their tickets for a potential winning combination. In the indicative example, they need to match 10 numbers in order to win the top prize for the draw event, and 9, 8, 7, 6, or 5 numbers to win any of the secondary prizes. For the needs of this example, it is assumed that Oliver and Emily match 7 numbers and win $30 each, and Michael matches 8 numbers and wins $2,000. In this case, Oliver is still eligible for the jackpot. Both Emily's and Michael's participation in the game has ended; however they decide to purchase a single participation for the next draw event, thus they pay an additional $1 to receive a ticket containing an entry of 8 numbers, randomly selected out of the 80 available.

The system conducts the second draw event, drawing 16 numbers out of the 80 available. Oliver, Emily and Michael check their tickets for a potential winning combination. In the indicative example, they need to match 8 numbers in order to win the top prize for the draw event, and 7, 6, 5 or 4 numbers to win any of the secondary prizes. For the needs of the example, Oliver matches 7 numbers and wins $5,000 (i.e. he is still eligible for the jackpot after 2 successful draw events), Emily matches 1 number and thus does not receive a prize, and Michael matches 8 numbers and wins $100,000.

Emily's and Michael's participation in the game has ended; however, Michael decides to purchase a single participation for the next draw event, thus he pays an additional $1 to receive a ticket containing an entry of 6 numbers, randomly selected out of the 60 available.

The third draw event produces 10 numbers out of the 60 available. In the indicative example, the players need to match 6 numbers in order to win the top prize for the draw event, and 5, 4 or 3 numbers to win any of the secondary prizes. For the needs of the example, Oliver matches 5 numbers and wins $500 (i.e. he is still eligible for the jackpot after 3 successful draw events), and Michael matches 6 numbers, thus receives $50,000. Emily does not participate in this draw event because she has not purchased an entry. Michael's participation in the game has ended; however he decides to purchase a single participation for the next draw event, thus he pays an additional $1 to receive a ticket containing an entry of 5 numbers, randomly selected out of the 40 available.

The fourth draw event produces 5 numbers out of the 40 available. The players need to match 3 numbers in order to win the top prize for the draw event, and 2 numbers to win the secondary prize. Oliver and Michael match 3 numbers and receive $400 each (only Oliver is eligible for the jackpot, due to his win in 4 draw events). Michael's participation in the game has ended; however, he decides to purchase again a single participation for the next draw event, thus he pays an additional $1 to receive a ticket containing an entry of 1 number, randomly selected out of the 20 available.

The system conducts the fifth and final draw event for this indicative example, drawing 1 number out of the 20 available. The players need to match 1 number in order to win the prize for the draw event. For the needs of this example, both Oliver and Michael have matched the drawn number and win $10 each. In addition to his winnings from the fifth draw, Oliver, having won a prize in all 5 draw events and having purchased a ticket for the set of 5 draw events, receives the jackpot collected for this set of 5 draw events. Michael, although he also won a prize in all draw events, did not purchase a participation for the set of 5 draw events prior to the start of the first draw event available, thus he does not qualify for a share of the jackpot.

In the end of this set of 5 draw events:

- Oliver has participated in all 5 draw events, has paid $5 (i.e. $1 for each draw event), and has won $5,940 (i.e. $30 in the 1$^{st}$ draw event, $5,000 in the 2$^{nd}$ draw event, $500 in the 3$^{rd}$ draw event, $400 in the 4$^{th}$ draw event, and $10 in the 5$^{th}$ draw event), as well as the jackpot,
- Emily has participated in the first 2 draw events, has paid $2 (i.e. $1 for each draw event), and has won $30 (i.e. $30 in the 1$^{st}$ draw event, and $0 in the 2$^{nd}$ draw event), and
- Michael has participated in all 5 draw events, has paid $5 (i.e. $1 for each draw event), and has won $152,410 (i.e. $2,000 in the 1$^{st}$ draw event, $100,000 in the 2$^{nd}$ draw event, $50,000 in the 3$^{rd}$ draw event, $400 in the 4$^{th}$ draw event, and $10 in the 5$^{th}$ draw event).

Please note that this is an exemplary embodiment of the planned method of implementation, and is designed with the intention to direct players to purchase their participation in the entire set of 5 draw events prior to the start of the set of 5 draw events, in contrast to waiting for the winning results of each draw event in order to decide whether to participate in the next one. In another example, the game design could allow the draw-by-draw participation of the player to be eligible for the jackpot, in which case in the previously examined example both players (i.e. Oliver and Michael who participated in all 5 draw events) would share the jackpot in equal shares and/or any combination of shares designed in the game-operating system (e.g., but not limited to, awarding higher portion of the available jackpot to the players who purchase an entry to the entire set of 5 draw events than the players who purchase a series of 5 single draw event entries).

Example 3: 2 Players Share the Jackpot

As an example of a single embodiment of the present invention, let assume that James and Patricia decide to participate in the game independently. In this exemplary embodiment, the game is designed with a set of 5 draw events, participation in each is priced at $1. In this exemplary embodiment, the first draw event includes drawing 24 numbers out of a pool of 100 available, the second drawing 16 numbers out of a pool of 80, the third drawing 10 numbers out of 60, the fourth drawing 5 numbers out of 40, and the fifth drawing a single number out of 20 available (as presented in the FIG. 6A).

Both James and Patricia decide to purchase a ticket for the set of 5 draw events, thus they are both eligible for the jackpot, in addition to the prizes in each individual draw event. In this indicative example, they will each receive a ticket containing 5 different number combinations, each for a single draw event [one containing 10 randomly drawn numbers out of a pool of 100 (10/100), one containing 8 numbers out of a pool of 80 (8/80), one with 6 numbers drawn out of 60 (6/60), one with 3 numbers out of 40 (3/40), and one with a single number out of 20 possible (1/20)], and they pay $5 in total–$1 for each number combination they participate with.

During the first draw event, 24 numbers are drawn out of a pool of 100 numbers. Both James and Patricia check their tickets for a potential winning combination. In the indicative example, they need to match 10 numbers in order to win the top prize for the draw event, and 9, 8, 7, 6, or 5 numbers to win any of the secondary prizes. For the needs of this example, James matches 7 numbers and wins $30, and Patricia matches 10 numbers and wins $250,000. In this case, both players are still eligible for the jackpot.

The system conducts the second draw event, drawing 16 numbers out of the 80 available. Both players check their tickets for a potential winning combination. In the indicative example, they need to match 8 numbers in order to win the top prize for the draw event, and 7, 6, 5 or 4 numbers to win any of the secondary prizes. For the needs of the example, James matches 7 numbers and wins $5,000, and Patricia matches 8 numbers and wins $100,000. Both players are still eligible for the jackpot after winning in 2 draw events.

The third draw event produces 10 numbers out of the 60 available. In the indicative example, the players need to match 6 numbers in order to win the top prize for the draw event, and 5, 4 or 3 numbers to win any of the secondary prizes. For the needs of the example, James matches 5 numbers and wins $500, and Patricia matches 6 numbers and wins $50,000. Both players are still eligible for the jackpot after winning in 3 draw events.

The fourth draw event produces 5 numbers out of the 40 available. The players need to match 3 numbers in order to win the top prize for the draw event, and 2 numbers to win the secondary prize. James and Patricia match 3 numbers and receive $400 each. Both players are still eligible for the jackpot after winning in 4 draw events.

The system conducts the fifth and final draw event for this indicative example, drawing 1 number out of the 20 available. The players need to match this number in order to win the prize for the draw event. For the needs of this example, both James and Patricia have matched the drawn number and win $10 each. In addition to their winnings in the fifth draw event, both players, having won a prize in all 5 draw events, share the jackpot assigned for this set of 5 draw events.

In the end of this set of 5 draw events:

James has participated in all 5 draw events, has paid $5 (i.e. $1 for each draw event), and has won $5,940 (i.e. $30 in the 1st draw event, $5,000 in the 2nd draw event, $500 in the 3rd draw event, $400 in the 4th draw event, and $10 in the 5th draw event), as well as half of the jackpot, and Patricia has participated in all 5 draw events, has paid $5 (i.e. $1 for each draw event), and has won $400,410 (i.e. $250,000 in the 1st draw event, $100,000 in the 2nd draw event, $50,000 in the 3rd draw event, $400 in the 4th draw event, and $10 in the 5th draw event), as well as half of the jackpot.

Example 4: Consecutive-Linked Draws (Set of 5 Draw Events Vs Consecutive Sets of 5 Draw Events)

As an example of a single embodiment of the present invention, let assume that George and Harry decide to participate in the game independently. In this exemplary embodiment, the game is designed with a set of 5 draw events, participation in each is priced at $1. In this exemplary embodiment, the first draw event includes drawing 24 numbers out of a pool of 100 available, the second drawing 16 numbers out of a pool of 80, the third drawing 10 numbers out of 60, the fourth drawing 5 numbers out of 40, and the fifth drawing a single number out of 20 available (as presented in the FIG. 6A).

Both George and Harry decide to purchase a ticket eligible for a set of 5 draw events, thus be eligible for the jackpot, in addition to the prizes for the individual draw events. In this indicative example, the game-operating system will dispense for each of the two players a ticket containing 5 different number combinations, each for a single draw event [one containing 10 randomly drawn numbers out of a pool of 100 (10/100), one containing 8 numbers out of a pool of 80 (8/80), one with 6 numbers drawn out of 60 (6/60), one with 3 numbers out of 40 (3/40), and one with a single number out of 20 possible (1/20)], and they pay $5 in total–$1 for each number combination they participate with. However, Harry decides to participate in two sets of 5 draw events, thus pays an additional $5 fee, and receives a second ticket containing 5 different number combinations, each for a single draw event [one containing 10 randomly drawn numbers out of a pool of 100 (10/100), one containing 8 numbers out of a pool of 80 (8/80), one with 6 numbers drawn out of 60 (6/60), one with 3 numbers out of 40 (3/40), and one with a single number out of 20 possible (1/20)], which is eligible for the set of 5 draw events configured to start after the upcoming set of 5 draw events ends (i.e. after the fifth draw event of this set of 5 draws has been conducted).

During the first draw event, 24 numbers are drawn out of a pool of 100 numbers. Both George and Harry check their tickets for a potential winning combination. In the indicative example, they need to match 10 numbers in order to win the top prize for the draw event, and 9, 8, 7, 6, or 5 numbers to win any of the secondary prizes. For the needs of this example, George matches 7 numbers and wins $30, and Harry matches 10 numbers and wins $250,000. In this case, both players are still eligible for the jackpot.

The system conducts the second draw event, drawing 16 numbers out of the 80 available. Both players check their tickets for a potential winning combination. In the indicative example, they need to match 8 numbers in order to win the top prize for the draw event, and 7, 6, 5 or 4 numbers to win any of the secondary prizes. For the needs of the example, George matches 7 numbers and wins $5,000, and Harry matches 8 numbers and wins $100,000. Both players are still eligible for the jackpot after winning in 2 draw events.

The third draw event produces 10 numbers out of the 60 available. In the indicative example, the players need to match 6 numbers in order to win the top prize for the draw event, and 5, 4 or 3 numbers to win any of the secondary prizes. For the needs of the example, George matches 5 numbers and wins $500, and Harry matches 6 numbers and wins $50,000. Both players are still eligible for the jackpot after winning in 3 draw events.

The fourth draw event produces 5 numbers out of the 40 available. The players need to match 3 numbers in order to win the top prize for the draw event, and 2 numbers to win the secondary prize. George and Harry match 3 numbers and receive $400 each. Both players are still eligible for the jackpot after winning in 4 draw events.

The system conducts the fifth and final draw event for this indicative example, drawing 1 number out of the 20 available. The players need to match this number in order to win the prize for the draw event. For the needs of this example, George match the drawn number and wins $10; however, Harry does not match the drawn number thus does not win a prize for this draw event. In addition to his winnings from this draw event, George, having won a prize in all 5 draw events, wins the jackpot collected for this set of 5 draw events. Harry, having lost in the last draw event, does not win any part of the jackpot.

In the end of this set of 5 draw events:

George has participated in all 5 draw events, has paid $5 (i.e. $1 for each draw event), and has won $5,940 (i.e. $30 in the 1st draw event, $5,000 in the 2nd draw event, $500 in the 3rd draw event, $400 in the 4th draw event, and $10 in the 5th draw event), as well as the collected jackpot, and Harry has participated in all 5 draw events, has paid $5 (i.e. $1 for each draw event), and has won $400,400 (i.e. $250,000 in the 1st draw event, $100,000 in the 2nd draw event, $50,000 in the 3rd draw event, $400 in the 4th draw event, and $0 in the 5th draw event).

Harry has already secured his participation for the next set of 5 draw events with his $5 entry ticket, whereas George needs to purchase his entry before the 1st draw of the upcoming set of 5 draw events. Each set of 5 draw events is independent from the last, except for the jackpot roll-over in the case of no-winner in the previous set of 5 draw events (in the previously examined example, the new set of 5 draw events will commence with no collected jackpot fund, as George collected it at the end of the 5th draw event of the current set of 5 draw events).

Illustrative Operating Environments

FIG. 1 illustrates one embodiment of an environment in which the present invention may operate. However, not all of these components may be required to practice the invention, and variations in the arrangement and type of the components may be made without departing from the spirit or scope of the invention. In some embodiments, the inventive system and method may include a large number of members and/or concurrent transactions. In other embodiments, the inventive system and method are based on a scalable computer and network architecture that incorporates varies strategies for assessing the data, caching, searching, and database connection pooling. An example of the scalable architecture is an architecture that is capable of operating multiple servers.

In embodiments, members of the computer system 102-104 include virtually any computing device capable of receiving and sending a message over a network, such as network 105, to and from another computing device, such as servers 106 and 107, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in embodiments, client devices 102-104 are any device that is capable of connecting using a wired or wireless communication medium such as a PDA, POCKET PC, wearable computer, and any other device that is equipped to communicate over a wired and/or wireless communication medium.

In embodiments, each member device within member devices 102-104 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In embodiments, programming may include either Java, .Net, QT, C, C++ or other suitable programming language.

In embodiments, member devices 102-104 may be further configured to receive a message from another computing device employing another mechanism, including, but not limited to email, Short Message Service (SMS), Multimedia Message Service (MMS), instant messaging (IM), internet relay chat (IRC), mIRC, Jabber, and the like or a Proprietary protocol.

In embodiments, network 105 may be configured to couple one computing device to another computing device to enable them to communicate. In some embodiments, network 105 may be enabled to employ any form of computer readable media for communicating information from one electronic device to another. Also, in embodiments, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in some embodiments, remote computers and other related electronic devices could be remotely connected to either LANs or WANs via a modem and temporary telephone link. In essence, in some embodiments, network 105 includes any communication method by which information may travel between client devices 102-104, and servers 106 and 107.

Figure 2:
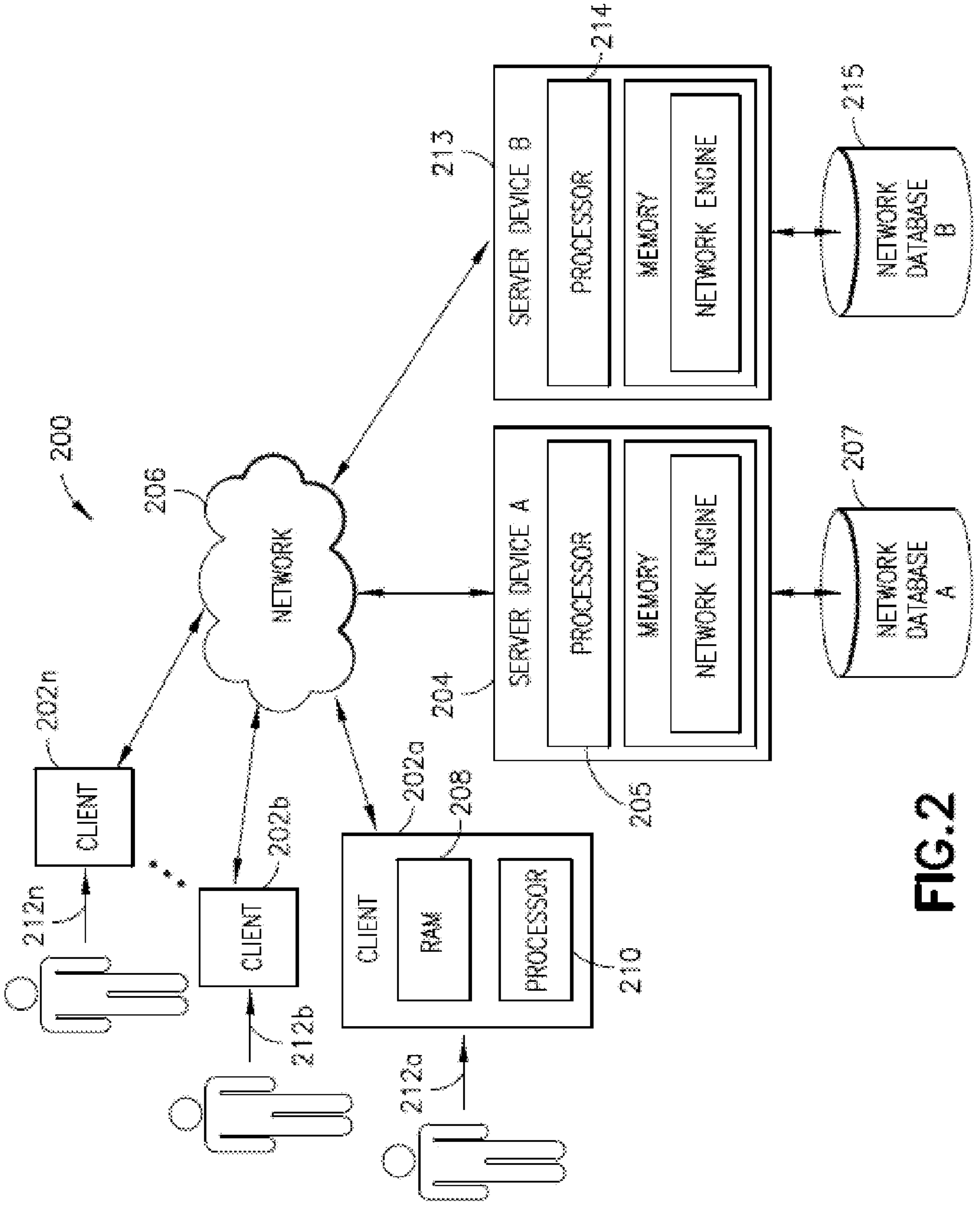

FIG. 2 shows another exemplary embodiment of the computer and network architecture that supports the methods and systems of the instant invention. In some embodiments, the member devices 202*a*, 202*b* thru 202*n* shown each at least includes a computer-readable medium, such as a random access memory (RAM) 208 coupled to a processor 210 or FLASH memory. In some embodiments, the processor 210 may execute computer-executable program instructions stored in memory 208. In some embodiments, such processors comprise a microprocessor, an ASIC, and state machines. In some embodiments, such processors comprise, or may be in communication with, media, for example computer-readable media, which stores instructions that, when executed by the processor, cause the processor to perform the steps described herein. Embodiments of computer-readable media may include, but are not limited to, an electronic, optical, magnetic, or other storage or transmission device capable of providing a processor, such as the processor 210 of client 202*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, and JavaScript.

In some embodiments, member devices 202*a-n* may also comprise a number of external or internal devices such as a mouse, a CD-ROM, DVD, a keyboard, a display, or other input or output devices. Examples of client devices 202*a-n* may be personal computers, digital assistants, personal digital assistants, cellular phones, mobile phones, smart phones, pagers, digital tablets, laptop computers, Internet appliances, and other processor-based devices. In general, a client device 202*a* may be any type of processor-based platform that is connected to a network 206 and that interacts with one or more application programs. Client devices 202*a-n* may operate on any operating system capable of supporting a browser or browser-enabled application, such as Microsoft™, Windows™, or Linux. The client devices 202*a-n* shown may include, for example, personal computers executing a browser application program such as Microsoft Corporation's Internet Explorer™, Apple Computer, Inc.'s Safari™, Mozilla Firefox, and Opera. Through the client devices 202*a-n*, users, 212*a-n* communicate over the network 206 with each other and with other systems and devices coupled to the network 206. As shown in FIG. 2, server devices 204 and 213 may be also coupled to the network 206. In an embodiment of the present invention, one or more clients can be a mobile client.

In some embodiments, the term "mobile electronic device" may refer to any portable electronic device that may or may not be enabled with location tracking functionality. For example, a mobile electronic device can include, but is not limited to, a mobile phone, Personal Digital Assistant (PDA), Blackberry™, Pager, Smartphone, or any other reasonable mobile electronic device. For ease, at times the above variations are not listed or are only partially listed, this is in no way meant to be a limitation.

In some embodiments, the terms "proximity detection," "locating," "location data," "location information," and "location tracking" as used herein may refer to any form of location tracking technology or locating method that can be used to provide a location of a mobile electronic device, such as, but not limited to, at least one of location information manually input by a user, such as, but not limited to entering the city, town, municipality, zip code, area code, cross streets, or by any other reasonable entry to determine a geographical area; Global Positions Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed, this is in no way meant to be a limitation.

In some embodiments, near-field wireless communication (NFC) can represent a short-range wireless communications technology in which NFC-enabled devices are "swiped," "bumped," "tap" or otherwise moved in close proximity to communicate. In some embodiments, NFC could include a set of short-range wireless technologies, typically requiring a distance of 10 cm or less.

In some embodiments, NFC may operate at 13.56 MHz on ISO/IEC 18000-3 air interface and at rates ranging from 106 kbit/s to 424 kbit/s. In some embodiments, NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, NFC peer-to-peer communication can be conducted when a plurality of NFC-enable devices within close proximity of each other.

Figure 3:
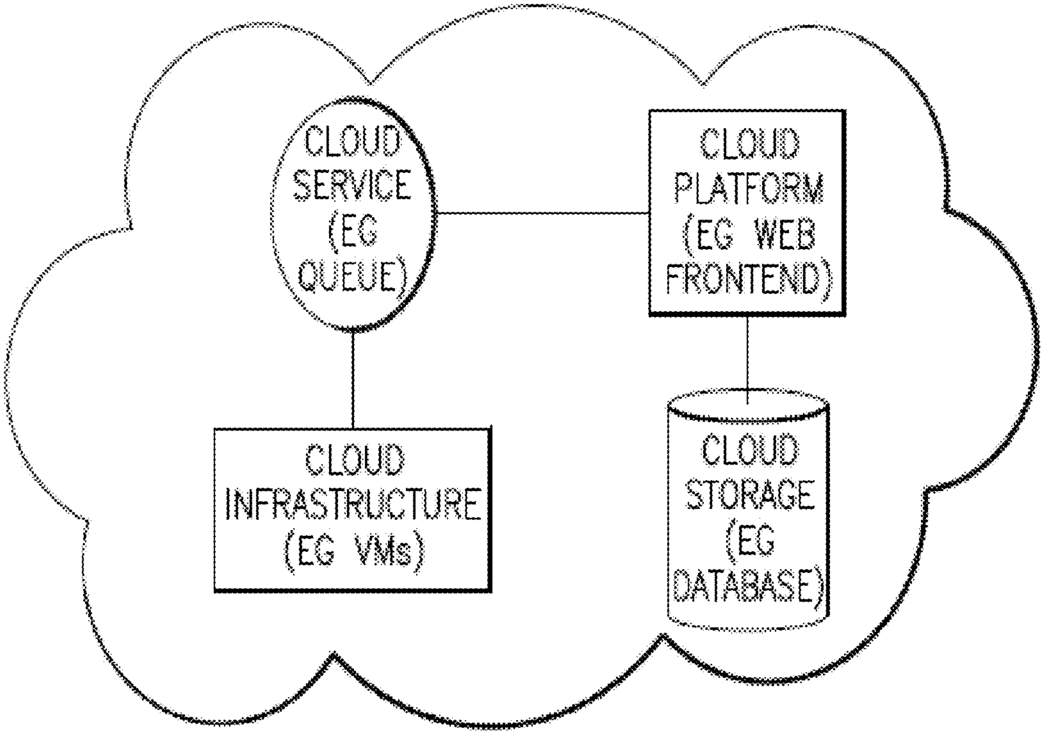
Figure 4:
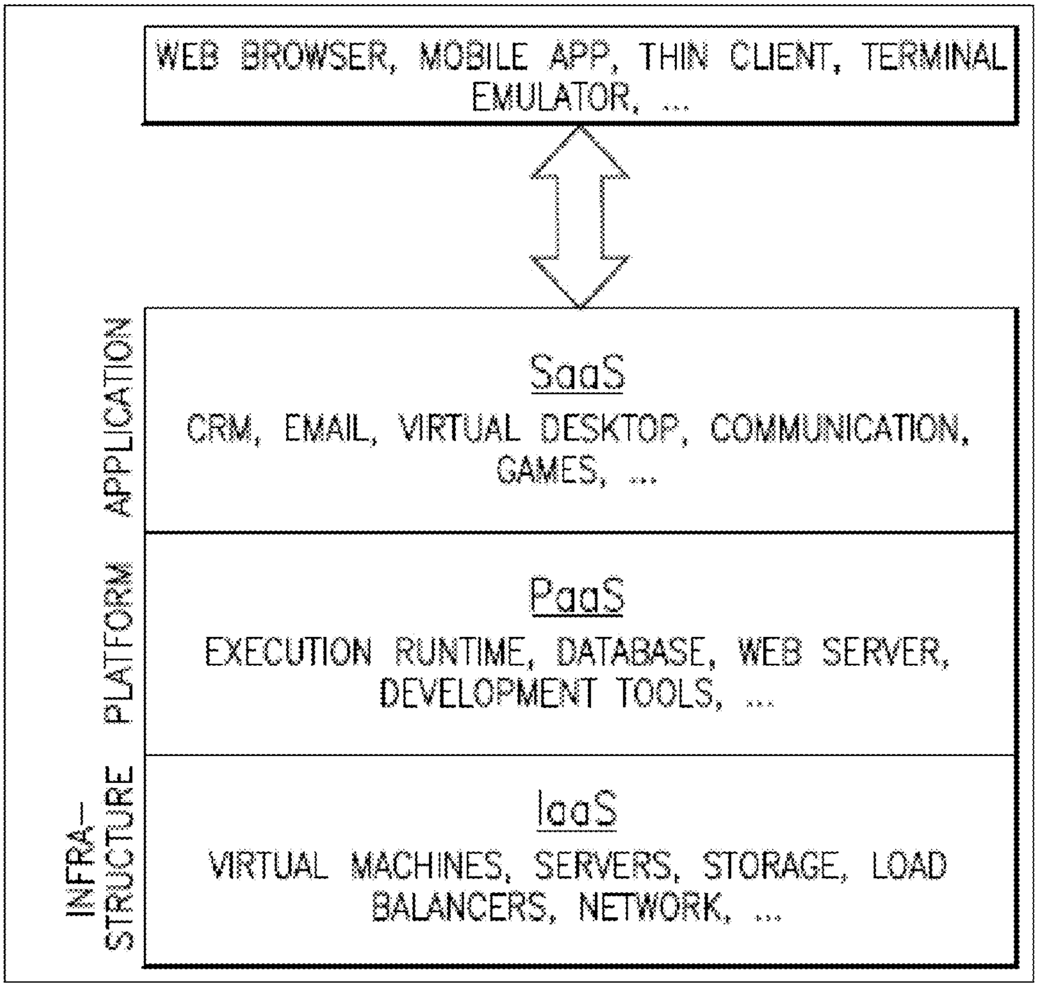

For purposes of the instant description, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). In some embodiments, the inventive game-operating system offers/manages the cloud computing/architecture as, but not limiting to: infrastructure a service (IaaS), platform as a service (PaaS), and software as a service (SaaS). FIGS. 3 and 4 illustrate schematics of exemplary implementations of the cloud computing/architecture.

Of note, the embodiments described herein may, of course, be implemented using any appropriate computer system hardware and/or computer system software. In this regard, those of ordinary skill in the art are well versed in the type of computer hardware that may be used (e.g., a mainframe, a mini-computer, a personal computer ("PC"), a network (e.g., an intranet and/or the internet)), the type of computer programming techniques that may be used (e.g., object oriented programming), and the type of computer programming languages that may be used (e.g., C++, Basic, AJAX, Javascript). The aforementioned examples are, of course, illustrative and not restrictive.

In some embodiments, the present invention provides for a computer-implemented method for conducting a game, where the method includes at least the following steps of: electronically receiving, by at least one specifically programmed computer processor, via a computer network, in real-time, game entries data representing game entries from at least a thousand (1,000) players to participate in the game; where at least one game entry identifies a single playing instance of the game, where the single playing instance of the game includes: i) a first selection to participate in a first drawing event, where the first selection identifies R numbers from a first pool of P numbers; ii) a second selection to participate in a second drawing event, where the second selection identifies Q numbers from a second pool of S numbers; iii) a third selection to participate in a third drawing event, where the third selection identifies T numbers from a third pool of U numbers; iv) a fourth selection to participate in a fourth drawing event, where the fourth selection identifies W numbers from a fourth pool of X numbers; and v) a fifth selection to participate in a fifth drawing event, where the fifth selection identifies Y numbers from a fifth pool of Z numbers; electronically determining, by the at least one specifically programmed computer processor, in real-time, based on at least one game mode, a plurality of winning results includes: i) at least one first winning result of the first drawing event, ii) at least one second winning result of the second drawing event, iii) at least one third winning result of the third drawing event, iv) at least one fourth winning result of the fourth drawing event, and v) at least one fifth winning result of the fifth drawing event; electronically determining, by the at least one specifically programmed computer processor, in real-time, at least one winning game entry from the game entries data, where the at least one winning game entry is a particular game entry in which: i) the first selection matches the at least one first winning result of the first drawing event, ii) the second selection matches the at least one second winning result of the second drawing event, iii) the third selection matches the at least one third winning result of the third drawing event, iv) the fourth selection matches the at least one fourth winning result of the fourth drawing event, and v) the fifth selection matches the at least one fifth winning result of the fifth drawing event; and electronically recording, by the at least one specifically programmed computer processor, in real-time, at least one portion of a jackpot to be distributed to a particular player associated with the at least one winning game entry.

In some embodiments, the first pool of P numbers equals to the second pool of S numbers; the second pool of S numbers equals to the third pool of U numbers; the third pool of U numbers equals to the fourth pool of X numbers; and the fourth pool of X numbers equals to the fifth pool of Z numbers.

In some embodiments, the at least one game entry includes: i) a first game entry identifying the first selection, ii) a second game entry identifying the second selection, iii) a third game entry identifying the third selection, iv) a fourth game entry identifying the fourth selection, and v) a fifth game entry identifying the fifth selection.

In some embodiments, the first game entry is separately received from the second game entry, the second game entry is separately received from the third game entry, the third game entry is separately received from the fourth game entry, and the fourth game entry is separately received from the fifth game entry.

In some embodiments, the first drawing event is conducted during a first time period, the second drawing event is conducted during a second time period, the third drawing event is conducted during a third time period, the fourth drawing event is conducted during a fourth time period, and the fifth drawing event is conducted during a fifth time period.

In some embodiments, the exemplary method may further include a step of electronically recording, by the at least one specifically programmed computer processor, in real-time, a plurality of drawing prizes associated with the one winning game entry, where the plurality of drawing prizes includes: i) at least one first drawing prize associated with the at least one first winning result of the first drawing event, ii) at least one second drawing prize associated with the at least one second winning result of the second drawing event, iii) at least one third drawing prize associated with the at least one third winning result of the third drawing event, iv) at least one fourth drawing prize associated with the at least one fourth winning result of the fourth drawing event, and v) at least one fifth drawing prize associated with the at least one fifth winning result of the fifth drawing event.

In some embodiments, the exemplary method may further include a step of electronically determining, by the at least one specifically programmed computer processor, in real-time, a single winning distribution amount based on: i) the at least one portion of the jackpot, and ii) the plurality of drawing prizes.

In some embodiments, the single winning distribution amount is the sum of: i) the at least one portion of the jackpot, and ii) the plurality of drawing prizes.

In some embodiments, the R number is larger than the Q number, the Q number is larger than the T number, the T number is larger than the W number, and the W number is larger than the Y number;

In some embodiments, the at least one first winning result of the first drawing event is determined based on at least one first game mode; the at least one second winning result of the second drawing event is determined based on at least one second game mode; the at least one third winning result of the third drawing event is determined based on at least one third game mode; the at least one fourth winning result of the fourth drawing event is determined based on at least one fourth game mode; and the at least one fifth winning result of the fifth drawing event is determined based on at least one fifth game mode. In some embodiments, the at least one first game mode is different from the at least one second game mode; the at least one second game mode is different from the at least one third game mode; the at least one third game mode is different from the at least one fourth game mode; and the at least one fourth game mode is different from the at least one fifth game mode.

In some embodiments, the present invention provides for a specifically programmed game operating computer system for conducting a game which includes at least components of: at least one specialized computer machine, including: a non-transient memory, electronically storing particular computer executable program code; and at least one computer processor which, when executing the particular program code, becomes a specifically programmed computer processor of the specifically programmed game operating computer system that is configured to perform at least the following operations: electronically receiving, via a computer network, in real-time, game entries data representing game entries from at least a thousand (1,000) players to participate in the game; where at least one game entry identifies a single playing instance of the game, where the single playing instance of the game includes: i) a first selection to participate in a first drawing event, where the first selection identifies R numbers from a first pool of P numbers; ii) a second selection to participate in a second drawing event, where the second selection identifies Q numbers from a second pool of S numbers; iii) a third selection to participate in a third drawing event, where the third selection identifies T numbers from a third pool of U numbers; iv) a fourth selection to participate in a fourth drawing event, where the fourth selection identifies W numbers from a fourth pool of X numbers; and v) a fifth selection to participate in a fifth drawing event, where the fifth selection identifies Y numbers from a fifth pool of Z numbers; electronically determining, in real-time, based on at least one game mode, a plurality of winning results which include: i) at least one first winning result of the first drawing event, ii) at least one second winning result of the second drawing event, iii) at least one third winning result of the third drawing event, iv) at least one fourth winning result of the fourth drawing event, and v) at least one fifth winning result of the fifth drawing event; electronically determining, in real-time, at least one winning game entry from the game entries data, where the at least one winning game entry is a particular game entry in which: i) the first selection matches the at least one first winning result of the first drawing event, ii) the second selection matches the at least one second winning result of the second drawing event, iii) the third selection matches the at least one third winning result of the third drawing event, iv) the fourth selection matches the at least one fourth winning result of the fourth drawing event, and v) the fifth selection matches the at least one fifth winning result of the fifth drawing event; and electronically recording, in real-time, at least one portion of a jackpot to be distributed to a particular player associated with the at least one winning game entry.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:

1. A computer-implemented method for conducting a game, wherein the method, comprising:

electronically receiving, by at least one specifically programmed computer processor, via a computer network, in real-time, game entries data representing game entries from at least a thousand (1,000) players who are playing the game;

wherein each playing instance the game comprises a plurality of drawing events;

wherein the game is configured so that at least one portion of a jackpot of the game is distributed to at least one player whose selections within a single playing instance of the game correspond to a plurality of wining results for the plurality of drawing events of the single playing instance of the game;

wherein at least one game entry of the received game entries corresponds to at least one particular single playing instance of the game, wherein the at least one particular single playing instance of the game comprises:

i) a first selection to participate in a first drawing event, wherein the first selection identifies R numbers from a first pool of P numbers;

ii) a second selection to participate in a second drawing event, wherein the second selection identifies Q numbers from a second pool of S numbers;

iii) a third selection to participate in a third drawing event, wherein the third selection identifies T numbers from a third pool of U numbers;

iv) a fourth selection to participate in a fourth drawing event, wherein the fourth selection identifies W numbers from a fourth pool of X numbers; and v) a fifth selection to participate in a fifth drawing event, wherein the fifth selection identifies Y numbers from a fifth pool of Z numbers;

electronically determining, by the at least one specifically programmed computer processor, in real-time, based on at least one game mode, a plurality of winning results for the plurality of drawing events of the at least one particular single playing instance of the game, wherein the plurality of winning results comprises:

i) at least one first winning result of the first drawing event, ii) at least one second winning result of the second drawing event, iii) at least one third winning result of the third drawing event, iv) at least one fourth winning result of the fourth drawing event, and v) at least one fifth winning result of the fifth drawing event;

electronically determining, by the at least one specifically programmed computer processor, in real-time, at least one winning game entry from the game entries data, wherein the at least one winning game entry is a particular game entry, having:

i) the first selection that matches the at least one first winning result of the first drawing event, ii) the second selection that matches the at least one second winning result of the second drawing event, iii) the third selection that matches the at least one third winning result of the third drawing event, iv) the fourth selection that matches the at least one fourth winning result of the fourth drawing event, and v) the fifth selection that matches the at least one fifth winning result of the fifth drawing event; and electronically causing, by the at least one specifically programmed computer processor, in real-time, at least one portion of a jackpot to be distributed to a particular player associated with the at least one winning game entry.

2. The computer-implemented method of claim 1, wherein the first pool of P numbers equals to the second pool of S numbers;

wherein the second pool of S numbers equals to the third pool of U numbers;

wherein the third pool of U numbers equals to the fourth pool of X numbers; and wherein the fourth pool of X numbers equals to the fifth pool of Z numbers.

3. The computer-implemented method of claim 1, wherein the at least one game entry of the received game entries comprises:

i) a first game entry identifying the first selection, ii) a second game entry identifying the second selection, iii) a third game entry identifying the third selection, iv) a fourth game entry identifying the fourth selection, and v) a fifth game entry identifying the fifth selection.

4. The computer-implemented method of claim 3, wherein the first game entry is separately received from the second game entry, wherein the second game entry is separately received from the third game entry, wherein the third game entry is separately received from the fourth game entry, and wherein the fourth game entry is separately received from the fifth game entry.

5. The computer-implemented method of claim 1, wherein the first drawing event is conducted during a first time period, wherein the second drawing event is conducted during a second time period, wherein the third drawing event is conducted during a third time period, wherein the fourth drawing event is conducted during a fourth time period, and wherein the fifth drawing event is conducted during a fifth time period.

6. The computer-implemented method of claim 1, further comprising:

electronically recording, by the at least one specifically programmed computer processor, in real-time, a plurality of drawing prizes associated with the at least one winning game entry, wherein the plurality of drawing prizes comprises:

i) at least one first drawing prize associated with the at least one first winning result of the first drawing event, ii) at least one second drawing prize associated with the at least one second winning result of the second drawing event, iii) at least one third drawing prize associated with the at least one third winning result of the third drawing event, iv) at least one fourth drawing prize associated with the at least one fourth winning result of the fourth drawing event, and v) at least one fifth drawing prize associated with the at least one fifth winning result of the fifth drawing event.

7. The computer-implemented method of claim 6, further comprising:

electronically determining, by the at least one specifically programmed computer processor, in real-time, a single winning distribution amount based on:

i) the at least one portion of the jackpot, and ii) the plurality of drawing prizes.

8. The computer-implemented method of claim 7, wherein the single winning distribution amount is the sum of:

i) the at least one portion of the jackpot, and ii) the plurality of drawing prizes.

9. The computer-implemented method of claim 1, wherein the R number is larger than the Q number, wherein the Q number is larger than the T number, wherein the T number is larger than the W number, and wherein the W number is larger than the Y number.

10. The computer-implemented method of claim 1, wherein the at least one first winning result of the first drawing event is determined based on at least one first game mode;

wherein the at least one second winning result of the second drawing event is determined based on at least one second game mode;

wherein the at least one third winning result of the third drawing event is determined based on at least one third game mode;

wherein the at least one fourth winning result of the fourth drawing event is determined based on at least one fourth game mode; and wherein the at least one fifth winning result of the fifth drawing event is determined based on at least one fifth game mode.

11. The computer-implemented method of claim 10, wherein the at least one first game mode is different from the at least one second game mode;

wherein the at least one second game mode is different from the at least one third game mode;

wherein the at least one third game mode is different from the at least one fourth game mode; and wherein the at least one fourth game mode is different from the at least one fifth game mode.

12. A specifically programmed game operating computer system for conducting a game, comprising:

at least one specialized computer machine, comprising:

a non-transient memory, electronically storing particular computer executable program code; and at least one computer processor which, when executing the particular program code, becomes a specifically programmed computer processor of the specifically programmed game operating computer system that is configured to perform at least the following operations:

electronically receiving, via a computer network, in real-time, game entries data representing game entries from at least a thousand (1,000) players who are playing the game;

wherein each playing instance the game comprises a plurality of drawing events;

wherein the game is configured so that at least one portion of a jackpot of the game is distributed to at least one player whose selections within a single playing instance of the game correspond to a plurality of wining results for the plurality of drawing events of the single playing instance of the game;

wherein at least one game entry of the received game entries corresponds to at least one particular single playing instance of the game, wherein the at least one particular single playing instance of the game comprises:

i) a first selection to participate in a first drawing event, wherein the first selection identifies R numbers from a first pool of P numbers;

ii) a second selection to participate in a second drawing event, wherein the second selection identifies Q numbers from a second pool of S numbers;

iii) a third selection to participate in a third drawing event, wherein the third selection identifies T numbers from a third pool of U numbers;

iv) a fourth selection to participate in a fourth drawing event, wherein the fourth selection identifies W numbers from a fourth pool of X numbers; and v) a fifth selection to participate in a fifth drawing event, wherein the fifth selection identifies Y numbers from a fifth pool of Z numbers;

electronically determining, in real-time, based on at least one game mode, a plurality of winning results for the plurality of drawing events of the at least one particular single playing instance of the game, wherein the plurality of winning results comprises:

i) at least one first winning result of the first drawing event, ii) at least one second winning result of the second drawing event, iii) at least one third winning result of the third drawing event, iv) at least one fourth winning result of the fourth drawing event, and v) at least one fifth winning result of the fifth drawing event;

electronically determining, in real-time, at least one winning game entry from the game entries data, wherein the at least one winning game entry is a particular game entry, having:

i) the first selection that matches the at least one first winning result of the first drawing event, ii) the second selection that matches the at least one second winning result of the second drawing event, iii) the third selection that matches the at least one third winning result of the third drawing event, iv) the fourth selection that matches the at least one fourth winning result of the fourth drawing event, and v) the fifth selection that matches the at least one fifth winning result of the fifth drawing event; and electronically causing, in real-time, at least one portion of a jackpot to be distributed to a particular player associated with the at least one winning game entry.

13. The system of claim 12, wherein the first pool of P numbers equals to the second pool of S numbers;

wherein the second pool of S numbers equals to the third pool of U numbers;

wherein the third pool of U numbers equals to the fourth pool of X numbers; and wherein the fourth pool of X numbers equals to the fifth pool of Z numbers.

14. The system of claim 12, wherein the at least one game entry of the received game entries comprises:

i) a first game entry identifying the first selection,
ii) a second game entry identifying the second selection,
iii) a third game entry identifying the third selection,
iv) a fourth game entry identifying the fourth selection, and
v) a fifth game entry identifying the fifth selection.

15. The system of claim 14,
wherein the first game entry is separately received from the second game entry,
wherein the second game entry is separately received from the third game entry,
wherein the third game entry is separately received from the fourth game entry, and
wherein the fourth game entry is separately received from the fifth game entry.

16. The system of claim 12,
wherein the first drawing event is conducted during a first time period,
wherein the second drawing event is conducted during a second time period,
wherein the third drawing event is conducted during a third time period,
wherein the fourth drawing event is conducted during a fourth time period, and
wherein the fifth drawing event is conducted during a fifth time period.

17. The system of claim 12, wherein the specifically programmed computer processor of the specifically programmed game operating computer system is further configured to perform:
electronically recording, in real-time, a plurality of drawing prizes associated with the one winning game entry, wherein the plurality of drawing prizes comprises:
i) at least one first drawing prize associated with the at least one first winning result of the first drawing event,
ii) at least one second drawing prize associated with the at least one second winning result of the second drawing event,
iii) at least one third drawing prize associated with the at least one third winning result of the third drawing event,
iv) at least one fourth drawing prize associated with the at least one fourth winning result of the fourth drawing event, and
v) at least one fifth drawing prize associated with the at least one fifth winning result of the fifth drawing event.

18. The system of claim 17, wherein the specifically programmed computer processor of the specifically programmed game operating computer system is further configured to perform:
electronically determining, in real-time, a single winning distribution amount based on:
i) the at least one portion of the jackpot, and
ii) the plurality of drawing prizes.

19. The system of claim 18, wherein the single winning distribution amount is the sum of:
i) the at least one portion of the jackpot, and
ii) the plurality of drawing prizes.

20. The system of claim 12, wherein the R number is larger than the Q number, wherein the Q number is larger than the T number, wherein the T number is larger than the W number, and wherein the W number is larger than the Y number.

21. The system of claim 12,
wherein the at least one first winning result of the first drawing event is determined based on at least one first game mode;
wherein the at least one second winning result of the second drawing event is determined based on at least one second game mode;
wherein the at least one third winning result of the third drawing event is determined based on at least one third game mode;
wherein the at least one fourth winning result of the fourth drawing event is determined based on at least one fourth game mode; and
wherein the at least one fifth winning result of the fifth drawing event is determined based on at least one fifth game mode.

22. The system of claim 21,
wherein the at least one first game mode is different from the at least one second game mode;
wherein the at least one second game mode is different from the at least one third game mode;
wherein the at least one third game mode is different from the at least one fourth game mode; and
wherein the at least one fourth game mode is different from the at least one fifth game mode.

* * * * *